(12) United States Patent
Abe et al.

(10) Patent No.: US 8,734,069 B2
(45) Date of Patent: May 27, 2014

(54) ROTARY CUTTING TOOL

(75) Inventors: Taro Abe, Akashi (JP); Toru Narita, Moriya (JM); Sachio Yamada, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 388 days.

(21) Appl. No.: 12/998,171

(22) PCT Filed: Sep. 25, 2009

(86) PCT No.: PCT/JP2009/004864
§ 371 (c)(1),
(2), (4) Date: May 31, 2011

(87) PCT Pub. No.: WO2010/035475
PCT Pub. Date: Apr. 1, 2010

(65) Prior Publication Data
US 2011/0214552 A1  Sep. 8, 2011

(30) Foreign Application Priority Data

Sep. 25, 2008 (JP) ................. 2008-246257

(51) Int. Cl.
*B23B 27/16* (2006.01)
(52) U.S. Cl.
USPC .............. 408/239 R; 407/33; 407/48; 407/11
(58) Field of Classification Search
USPC .......... 407/103, 104, 33, 42, 48, 11, 66, 102; 408/238, 239 R, 231, 233
See application file for complete search history.

(56) References Cited

U.S. PATENT DOCUMENTS 2,153,236 A * 4/1939 Christman ................. 407/33
5,139,371 A * 8/1992 Kraft et al. ................ 407/101
(Continued)

FOREIGN PATENT DOCUMENTS

| DE | 102004023710 A1 | * 12/2005 |
| JP | 2846020 B2 | 12/1991 |
| JP | 2002-144112 A | 5/2002 |
| JP | 2005-305643 A | 11/2005 |

OTHER PUBLICATIONS

Notice of Allowance mailed Jul. 10, 2012, issued for the Japanese Patent Application No. 2010-530732 and English translation thereof.

(Continued)

*Primary Examiner* — Daniel Howell
*Assistant Examiner* — Nicole N Ramos
(74) *Attorney, Agent, or Firm* — Edwards Wildman Palmer LLP

(57) ABSTRACT

A rotary cutting tool is provided with a tool body having a shank portion and a neck portion, an insert attachment seat formed at the tip of the neck portion, and a cutting insert detachably mounted on the insert attachment seat so as to be coaxial with the axis line of the shank portion. The insert attachment seat is provided with a bottom surface on which a side surface which serves as a seating surface of a cutting insert is seated and a wall surface in contact with a peripheral surface of the cutting insert. On the bottom surface, a plurality of recessed grooves which are recessed from the bottom surface to extend in the circumferential direction of the neck portion, with the both ends being opened on an outer peripheral surface of the neck portion.

15 Claims, 18 Drawing Sheets

(56) References Cited

U.S. PATENT DOCUMENTS

| | | | |
|---|---|---|---|
| 6,896,450 B2 * | 5/2005 | Rothenstein | 408/59 |
| 7,156,006 B2 * | 1/2007 | Hyatt et al. | 82/1.11 |
| 7,325,471 B2 * | 2/2008 | Massa et al. | 82/1.11 |
| 2003/0210963 A1 * | 11/2003 | Kakai et al. | 408/231 |
| 2005/0047885 A1 | 3/2005 | Hyatt et al. | |
| 2008/0232909 A1 | 9/2008 | Filho et al. | |

OTHER PUBLICATIONS

International Search Report dated Nov. 2, 2009, issued for PCT/JP2009/004864.

* cited by examiner (a)　　　　　　　　　　(b)

(a)    (b)

(a)

(b)

(c)

ROTARY CUTTING TOOL

TECHNICAL FIELD

The present invention relates to a rotary cutting tool in which a circular plate-like cutting insert is detachably mounted on an insert attachment seat formed at a neck portion of a tool body.

Priority is claimed on Japanese Patent Application No. 2008-246257, filed Sep. 25, 2008, the content of which is incorporated herein by reference.

BACKGROUND ART

As disclosed in Patent Document 1, for example, the conventional rotary cutting tool is known as a rotary cutting tool in which a circular plate-like cutting insert is mounted on a sheet member attached to a tool body so as to rotate freely, thus performing cutting by allowing the cutting insert to be driven rotationally with the sheet member by a cutting resistance which acts on the cutting insert. Moreover, in the above-described rotary cutting tool, there is a case where the cutting insert does not rotate depending on the direction in which the cutting insert is fed to a work piece.

Further, when the cutting insert is mounted on the tool body so as to rotate freely with the sheet member, the sheet member is required to be attached to the tool body via a bearing, etc., which may pose a problem with durability, etc., of the sheet member. It is to be noted that, as a conventional clamping mechanism of the above-described circular plate-like cutting insert, Patent Document 1 has disclosed that which is described in Patent Document 2.

On the other hand, in recent years, a composite processing machine has been widely used in which a tool retaining portion of a lathe can be rotated to provide milling functions. According to the above-described composite processing machine, a work piece can be turned, while the circular plate-like cutting insert is driven rotationally around the central axis line thereof at a desired rotating speed, irrespective of the direction in which the work piece is fed. Further, no bearing, etc., for rotating the cutting insert is required to be mounted on the tool body.

Here, FIG. 17 and FIG. 18 embody a rotary cutting tool which is attached to the above-described composite processing machine and driven rotationally. In the thus embodied rotary cutting tool, the rear end portion of a tool body 1 which is made of steel, etc., and formed approximately in a cylindrical shape at the center of the axis line O is provided as a shank portion 1A which is attached to the composite processing machine, and the leading end portion of the tool body 1 is provided as a neck portion 1B. A circular plate-like cutting insert 3 is mounted on a recessed insert attachment seat 2 formed on the tip surface (leading end surface) of the neck portion 1B so as to be coaxial therewith.

This cutting insert 3 is made of a hard material such as cemented carbide, etc. In this example, the cutting insert 3 is a circular truncated cone-like positive insert which is formed so as to gradually decrease in the outer diameter of a peripheral surface as a flank 6 arranged between a rake face 4 and a seating surface 5 from a first circular side surface which serves as the rake face 4 to a second circular side surface which serves as the seating surface 5 opposite thereto. Then, a circular cutting edge 7 is formed at a ridge line portion where the rake face 4 intersects the flank 6, and a mounting hole 9 into which a clamping screw 8 for mounting the cutting insert 3 on the tool body 1 is inserted is penetrated and installed from the rake face 4 to the seating surface 5 along the central axis C of the cutting insert 3 to coincide with the above-described axis line O.

In this example, the neck portion 1B of the tool body 1 on which the above-described cutting insert 3 is mounted is formed in a tapered long circular truncated cone shape in such a manner that the rear end portion thereof is made smaller in diameter than the above-described shank portion 1A and slightly decreased in the outer diameter gradually as the rear end portion moves to the leading end side. Then, the above-described insert attachment seat 2 formed on the tip surface of the neck portion 1B is recessed so as to accommodate a part on the side of the seating surface 5 of the cutting insert 3.

That is, as shown in FIG. 18, the insert attachment seat 2 is constituted with an externally circular bottom surface 2A perpendicular to the axis line O on which the seating surface 5 is seated, facing toward the leading end side so as to be further recessed from the above-described tip surface, and a recessed conical surface-like wall surface 2B at the center of the axis line O which extends in an inclined manner so as to gradually increase in diameter according to an angle of the flank 6 with respect to the seating surface 5 to the leading end side from a periphery of the bottom surface 2A. Further, a threaded hole 2C into which the above-described clamping screw 8 is screwed is formed at the center of the bottom surface 2A along the axis line O.

The cutting insert 3 is seated on the thus formed insert attachment seat 2 in such a manner that the seating surface 5 is firmly attached to the bottom surface 2A and a part on the side of the seating surface 5 of the flank 6 is firmly attached to the wall surface 2B. And the clamping screw 8 which has been inserted into the above-described mounting hole 9 is screwed into the threaded hole 2C, by which the cutting insert 3 is pressed by a flat countersunk screw head-like head portion 8A of the clamping screw 8 and mounted at the leading end of the tool body 1. Further, in the tool body 1 on which the cutting insert 3 has been mounted, the shank portion 1A is retained by a tool retaining portion of the above-described composite processing machine and driven rotationally around the axis line O at a predetermined rotating speed. And the above-described cutting edge 7 cuts into a work piece, thereby turning the work piece.

PRIOR ART DOCUMENTS

Patent Documents

Patent Document 1: Japanese Published Unexamined Patent Application No. 2002-144112
Patent Document 2: Japanese Patent No. 2846020

DISCLOSURE OF INVENTION

Problems to be Solved by the Invention

However, in the above-constituted rotary cutting tool, if the cutting insert 3 is not formed with a high degree of precision, as described above, it is difficult that in a state where the clamping screw 8 is screwed into and the cutting insert 3 is mounted on the tool body 1, the seating surface 5 is firmly attached to the bottom surface 2A, and the part on the side of the seating surface 5 of the flank 6 is also firmly attached to the wall surface 2B precisely at the same time. That is, where the outer diameter of the flank 6 of the cutting insert 3 is formed smaller than the inner diameter of the wall surface 2B, the cutting insert 3 rattles radially inside the insert attachment seat 2. On the other hand, where the outer diameter of the flank 6 is formed larger than the inner diameter of the wall surface 2B, the seating surface 5 of the cutting insert 3 is not firmly attached to the bottom surface 2A. Therefore, there is a drawback in that the cutting insert 3 may be mounted in an inclined manner. In both cases, when the tool body is driven rotationally, the cutting edge 7 will rotate eccentrically.

Further, where the cutting insert 3 is pressed by the flat countersunk screw head-like head portion 8A and mounted accordingly, as described in the clamping screw 8, even a smaller formation of the outer diameter of the flank 6 of the cutting insert 3 than the inner diameter of the wall surface 2B is able to prevent the cutting insert 3 from rattling radially and avoid the occurrence of extremely eccentric rotation. However, on the assumption that the flank 6 and the seating surface 5 are respectively firmly attached to the wall surface 2B and the bottom surface 2A, and the cutting insert 3 is formed with such dimensions that it can be mounted on the insert attachment seat 2, the cutting insert 3 is positioned in such a manner that the center of the mounting hole 9 to be pressed by the head portion 8A coincides with the axis line O. Therefore, for example, if the cutting insert 3 is a peripheral surface non-polished product (M grade product), the peripheral surface of which is sintered as it is, and the mounting hole 9 is not secured for being concentric with the peripheral surface (flank 6), that is, concentric with the circular cutting edge 7, the cutting edge 7 will still rotate eccentrically when the tool body 1 is driven rotationally. There is a drawback in that performing turning with a high degree of precision is difficult.

On the other hand, as described in Patent Document 1, a notch is formed on the side of the seating surface on a peripheral surface of the cutting insert. Or as described in Patent Document 2, a plurality of cuts which penetrate through a space between a wall surface of the insert attachment seat and an outer peripheral surface of the neck portion are installed in the circumferential direction and thereby, when a clamping screw is screwed into a cutting insert on an insert attachment seat, a peripheral wall portion between the wall surface of the insert attachment seat and the outer peripheral surface of the neck portion is elastically deformed to coincide with the center of the peripheral surface of the cutting insert with the axis line. In both cases, if there is found a variance in dimensional accuracy of the peripheral surface of the cutting insert, the variance can be absorbed by elastic deformation. Thereby, the seating surface of the cutting insert and a part on the side of the seating surface of the flank can be constantly attached firmly to the attachment seat. Thus, even if the cutting insert is not processed with a high degree of precision, a cutting edge can be prevented from rotating eccentrically. Further, since a flat countersunk screw is not needed, there will be no trouble resulting from the positioning action of the flat countersunk screw.

However, regarding the case described in Patent Document 2, an annular groove for preventing interference generated by a ridge line portion intersecting between the seating surface of the cutting insert and the peripheral surface is formed at a part where the bottom surface of the insert attachment seat intersects the wall surface. The above-described cut is made inside the annular groove or made up to a site beyond the annular groove depending on the circumstances, by which a spring segment can easily perform spring action, that is, the peripheral wall portion can be elastically deformed at a larger amount. However, where the above-described annular groove is formed to process the cut, an edge on the outer periphery of the seating surface which is positioned directly below the cutting edge of the cutting insert to undergo direct action of the cutting resistance is positioned above the annular groove extending over an entire circumference at a region equal in width to the annular groove and kept unsupported in any manner.

Further, regarding the case described in Patent Document 1, at a part where a peripheral surface of the cutting insert is notched, a clearance is made between the wall surface of the insert attachment seat and this part, and the seating surface which undergoes cutting resistance directly below the cutting edge is also notched. Therefore, on application of a clamping mechanism described in Patent Document 1 or Patent Document 2, rigidity on mounting the insert is not secured in particular at a part of the cutting edge upon receipt of cutting resistance. Thus, there is still a drawback in that the cutting insert is mounted unstably to affect processing precision. There is also a drawback in that since the cutting insert is mounted unstably, chipping damage, etc., may easily occur to the cutting edge to result in damaging a tool.

The present invention has been made under the above circumstances, and an object of the present invention is to provide a rotary cutting tool which is capable of making the center of a circular cutting edge coincide with the axis line of a tool body, for example, even where a cutting insert is a peripheral surface non-polished product as described above and lower in the degree of forming precision of a flank, and also capable of reliably supporting the cutting insert directly below the cutting edge which undergoes cutting resistance, thereby securing the rigidity on mounting the insert and performing turning with a high degree of precision even where the cutting insert is a peripheral surface non-polished product lower in cost.

Means for Solving the Problems

A rotary cutting tool of the present invention is provided with a tool body having a shank portion and a neck portion protruding from the shank portion and formed externally in a circular truncated cone shape or a cylindrical shape, a recessed insert attachment seat formed at the tip of the neck portion of the tool body, and a circular plate-like cutting insert which is detachably mounted on the insert attachment seat so as to be coaxial with the axis line of the shank portion. In the rotary cutting tool of the present invention, the insert attachment seat is provided with a bottom surface on which a side surface serving as a seating surface of the cutting insert is seated and a wall surface in contact with a peripheral surface of the cutting insert, a plurality of recessed grooves which are Recessed from the bottom surface to extend in the circumferential direction of the neck portion, with the both ends being opened to the outer peripheral surface of the neck portion from the wall surface, are formed on the bottom surface so as to travel around the insert attachment seat around the axis line. Each of these recessed grooves extends in such a manner that at least the both ends thereof move radially to the outer peripheral side with respect to the axis line toward the both end sides from a circle which is centered on the axis line in contact with the center between these both ends, and the bottom surface extends between the mutually opposing ends of the recessed grooves adjacent in the circumferential direction.

In the above-described rotary cutting tool, first, the plurality of recessed grooves is formed on the bottom surface of the insert attachment seat so as to be recessed from the bottom surface. Each of these recessed grooves extends in the circumferential direction of the neck portion and the both ends thereof are opened from the wall surface of the insert attachment seat to an outer peripheral surface of the neck portion, by which the plurality of recessed grooves are as a whole formed so as to travel around the insert attachment seat. Thereby, a peripheral wall portion of the neck portion between the wall surface of the insert attachment seat and the outer peripheral surface of the neck portion can be elastically deformed at each part divided in plurality in the circumferential direction to a depth of the recessed groove.

Therefore, in a state where the cutting insert is mounted on the insert attachment seat, the peripheral wall portion is as described above elastically deformed, and the wall surface of the insert attachment seat is firmly attached to the peripheral surface of the cutting insert and in contact therewith. Thereby, the center of the peripheral surface can be made coincident with the axis line of the shank portion. Thus, even if the cutting insert is a peripheral surface non-polished product lower in cost as described above, the circular cutting edge continuing to the peripheral surface can be precisely arranged at the center of the axis line of the shank portion which serves as the rotating center of the tool body.

Further, in the above-described rotary cutting tool, each of the plurality of recessed grooves is formed in such a manner that at least the both ends thereof opened to the outer peripheral surface of the neck portion extend radially to the outer peripheral side with respect to the axis line as the recessed groove moves to the both ends from a circle which is centered on the axis line in contact with the center between these both ends. Thus, a part between a pair of mutually opposing ends of the recessed grooves adjacent in the circumferential direction is formed so as to protrude to the outer peripheral side with respect to the circle. Therefore, between the thus protruded ends of the recessed groove, the bottom surface of the insert attachment seat can also be allowed to extend so as to protrude to the outer peripheral side with respect to the circle. It is, thus, possible to support the cutting insert by allowing an outer peripheral edge on the seating surface of the cutting insert to be in contact with the bottom surface of the insert attachment seat.

Therefore, according to the above-described rotary cutting tool, cutting resistance acting from the cutting edge when cutting can be received directly on the bottom surface, where an outer peripheral edge of the seating surface directly below the cutting edge (directly at the back thereof) is in contact with the bottom surface of the insert attachment seat. Further, even where the outer peripheral edge of the seating surface directly below the cutting edge is on a recessed groove, a pair of bottom surface portions extending so as to protrude to the outer peripheral side from the circle on the sides of the both ends of the recessed groove are used to support the outer peripheral edge of the seating surface, thus making it possible to disperse and receive the cutting resistance. Thereby, it is possible to secure rigidity on mounting the cutting insert and retain stably the cutting insert on the insert attachment seat. According to the present invention, as described above, the center of the cutting edge is made to precisely coincide with the axis line of the shank portion and also turning can be performed with a high degree of precision and stably. Further, the cutting insert can be mounted stably, thus making it possible to prevent damaging a tool such as chipping of the cutting edge.

As described above, if a radius from the axis line of the bottom surface of the insert attachment seat extending to the outer peripheral side from the circle is made equal to or slightly larger than a radius of the seating surface of the cutting insert which is seated on this part, the outer peripheral edge of the seating surface can be supported in a state where the cutting insert is seated on the insert attachment seat so as to be firmly attached to the bottom surface and in contact therewith out running off from the bottom surface which extends between the mutually opposing ends of a recessed groove.

However, if the radius from the axis line of the bottom surface, for example, is larger than the radius of the seating surface of the cutting insert, the bottom surface extending to a part between the ends of the recessed groove will run off from the seating surface. At this part, since peripheral wall portions divided in plurality as described above are provided at intervals, chips made when cutting will enter thereinto, deforming a bottom surface which has run off or a tool body portion continuing thereto, thereby posing a problem in seating the cutting insert stably.

Therefore, in order to solve the above problem, it is acceptable that the run-off part of the bottom surface be chamfered, etc., and allowed to move inside, by which in a state where the cutting insert is mounted on the insert attachment seat, the seating surface of the cutting insert overhangs so as to run off from the bottom surface of the insert attachment seat extending between mutually opposing ends of the recessed groove, thereby protecting the tool body at this part. However, if the seating surface thereof overhangs excessively, the cutting insert is still not seated stably. Thus, it is desirable that the seating surface overhang so as to run off from the bottom surface of the insert attachment seat in a range of 1.0 mm or less and preferably in a range of 0.5 mm or less.

Further, in the present invention, the peripheral wall portion which is formed between the groove bottom of the recessed groove from the wall surface of the insert attachment seat and the outer peripheral surface of the neck portion is elastically deformed as described above, by which the circular plate-like cutting insert can be retained so as to be coaxial with the axis line of the tool body. However, where the thickness of the peripheral wall portion is excessively thin, strength and rigidity thereof are impaired, which may pose a problem in retaining the cutting insert reliably.

Thus, in order to cope with this problem, first, the recessed groove is formed so as to extend in an inclined manner radially to the inner peripheral side with respect to the axis line toward the groove bottom side of the recessed groove from the bottom surface of the insert attachment seat. Thereby, elastic deformation can be easily made at the tip side of the peripheral wall portion where the wall surface of the insert attachment seat is formed and the thickness is increased radially on the groove bottom side of the peripheral wall portion to secure strength and rigidity, thus making it possible to retain the cutting insert reliably and stably. It is to be noted that the recessed groove may be inclined at a fixed angle with respect to the axis line of the shank portion or at an angle gradually smaller to the groove bottom side so that a cross-section of the recessed groove along the axis line forms a convex curve line which is raised radially to the inner peripheral side with respect to the axis line. Further, in contrast thereto, the recessed groove may be inclined at an angle gradually increasing to the groove bottom side in such a manner that a cross-section of the recessed groove along the axis line forms a convex curve line which is raised radially to the outer peripheral side with respect to the axis line.

Further, as a second means, the peripheral wall portion formed between a recessed groove and an outer peripheral surface of the neck portion may be formed in such a manner that the circumferential width is increased along the groove bottom side of the recessed groove from the bottom surface of the insert attachment seat. Thereby, the peripheral wall portion is increased in strength and rigidity to secure the force of retaining the insert on the groove bottom side of the recessed groove, and the wall surface of the insert attachment seat at the tip side is displaced at a larger amount due to elastic deformation, thus making it possible to reliably retain the cutting insert so as to be coaxial with the axis line of the tool body.

In the above case, it is desirable that a circumferential end edge of the peripheral wall portion be formed so as to increase in circumferential width at least on the groove bottom side of the recessed groove as the circumferential end edge moves to the groove bottom side while being recessed and curved. Thereby, as the circumferential end edge moves to the groove bottom side, the peripheral wall portion is increased in circumferential width at a larger ratio, thus making it possible to further improve strength and rigidity of the peripheral wall portion.

Still further, as a third means, a peripheral wall portion formed between the recessed groove and the outer peripheral surface of the neck portion may be formed so as to increase in circumferential width at least on the groove bottom side of the recessed groove radially along the inner peripheral side with respect to the axis line. Thereby, the peripheral wall portion on the groove bottom side of the recessed groove is similarly improved in strength and rigidity, thus making it possible to secure the high force of retaining an insert.

Also in the above case, the circumferential end edge of the peripheral wall portion is formed so as to increase in circumferential width at least on the groove bottom side of the recessed groove as the circumferential end edge moves radially to the inner periphery with respect to the axis line while being recessed and curved, by which the circumferential width is increased along the inner peripheral side at a larger ratio on the groove bottom side. Thereby, higher strength and rigidity can be imparted to the peripheral wall portion. As a matter of course, if two or all of the first to the third means are provided, it is possible to retain the cutting insert stably and with a high degree of precision, with strength and rigidity secured at the peripheral wall portion more reliably.

Moreover, even with turning using an ordinary cutting tool or with a rotating process by a face mill, etc., in addition to a rotary cutting tool, coolant (cutting lubricant) is supplied for cooling and lubricating a cutting edge of a cutting insert and a cut site of a work piece. However, where a nozzle, etc., is arranged outside these tools to supply coolant, it may be difficult to reliably supply the coolant to the cutting edge or the cut site of the work piece since the supply is prevented by a tool body or chips made when cutting.

Thus, in the present invention, a supply hole for coolant is drilled on the tool body itself to supply the coolant, thereby making it possible to prevent the coolant from not being supplied by the tool body. Then, the supply hole drilled on the tool body is opened between the mutually opposing ends of recessed grooves adjacent in the circumferential direction on the groove bottom side of the recessed groove at the neck portion. Thereby, at this part, peripheral wall portions which have been divided in plurality as described above are provided at intervals. Thus, it is possible to reliably supply the coolant to the cutting insert through a clearance between the peripheral wall portions.

The supply hole for coolant is drilled along the axis line at a shank portion side, by which the shank portion can be prevented from being partially varied in strength and rigidity. Further, in the above-described composite processing machine, a supply hole communicatively connected to the above supply hole is formed on the axis line of the shank portion which serves as the center of driving rotationally a rotary cutting tool, thus making it possible to simplify the mechanism. On the other hand, the supply hole is drilled at an opening side of the neck portion so as to incline radially to the outer peripheral side with respect to the axis line along the tip side of the neck portion. Thereby, it is possible to supply the coolant reliably and efficiently from the supply hole along the axis line at the shank portion side to a cutting edge of the cutting insert arranged in a circular manner at the center of the axis line.

On the other hand, as described above, in order to form the both ends of each of the plurality of recessed grooves in such a manner as to extend radially to the outer peripheral side toward the both end sides from the circle, first, each of the plurality of recessed grooves is formed so as to extend in a tangential direction of the circle over the entire length, and the wall surface of the insert attachment seat is formed as a flat surface shape extending in the tangential direction at each part divided by the plurality of recessed grooves. Notched surfaces at least equal in number to the recessed grooves and extending in the tangential direction may be formed in the circumferential direction at least on the side of the seating surface on the peripheral surface of the cutting insert and allowed to be in contact with the wall surface.

In the above-described constitution, each of the recessed grooves extends in a straight line radially to the outer peripheral side in the tangential direction with respect to the circle over the entire length thereof toward the both end sides from the center in contact with the circle. Thereby, the recessed groove can be formed easily. Further, the pluralities of recessed grooves assume a polygon shape, when viewed from a direction opposite to the bottom surface. Therefore, an outer peripheral edge of a part between the notched surfaces in contact with the wall surface on the seating surface of the cutting insert is allowed to be in contact with the bottom surface of the insert attachment seat extending at a part between the ends of the recessed groove at corners of the polygon. Thereby, it is possible to support the cutting insert.

Where notched surfaces are formed on the peripheral surface of the insert and the insert attachment seat wall surface is formed as a flat surface shape, they are firmly attached and allowed to be in contact, by which the cutting insert can be restrained by cutting resistance from rotating around the axis line inside the insert attachment seat. For example, where the cutting insert is mounted with the clamping screw, the clamping screw can be prevented from loosening or in contrast, difficulty in detaching the cutting insert because of the clamping screw which has been tightly screwed thereinto can be prevented.

Secondly, where the peripheral surface of the cutting insert is free of the notched surfaces, that is, the peripheral surface of the cutting insert is formed in a circular surface shape which is centered on the axis line at least on the side of the seating surface, the wall surface of the insert attachment seat is also formed in a recessed circular-arc surface shape which is centered on the axis line at each part divided by the plurality of recessed grooves. And the peripheral surface is in contact therewith. Also in the above case, each of the plurality of recessed grooves may be formed so as to extend over the entire length in the tangential direction of the circle which is smaller in radius than a recessed circular arc formed by the wall surface.

Also in the above case, each of the recessed grooves extends in a straight line and can be therefore formed easily. Further, the plurality of recessed grooves are formed so as to assume a polygon shape, by which the bottom surface of the insert attachment seat is allowed to extend at a part spaced between the ends of adjacent recessed grooves which serve as corners of the polygon. On the other hand, the seating surface of the cutting insert is given a circle and supported at a part where the circle is superimposed on the corners of the polygon by being in contact with a bottom surface to which the outer peripheral edge of the seating surface of the cutting insert extends.

In this case, the bottom surface of the insert attachment seat is allowed to remain also between a recessed groove extending along a tangent of the circle smaller in radius and the insert attachment seat wall surface formed in a recessed circular-arc surface shape and larger in radius than this circle. The thus remaining bottom surface of the insert attachment seat is used to support the outer peripheral edge of the seating surface of the cutting insert, by which it is possible to receive cutting resistance acting from the cutting edge in a wider range and further improve rigidity on mounting the insert.

Further, thirdly, even where the wall surface of the insert attachment seat is formed in a recessed circular-arc surface shape which is centered on the axis line at each part divided by a plurality of recessed grooves and the peripheral surface of the cutting insert is also formed in a circular surface shape which is centered on the axis line at least on the side of the seating surface thereof and in contact with the wall surface, each of the plurality of recessed grooves is not formed so as to extend in the tangential direction of the circle along the entire length but may be formed in such a manner that each center thereof extends in a circular-arc shape along the circle and the both ends are formed in a straight line so as to extend, for example, along a tangent of the circle which is centered on the axis line smaller in radius than the above circle, thus extending radially to the outer peripheral side with respect to the axis line toward the both ends from the center thereof. Also in this case, the outer peripheral edge of the seating surface of the cutting insert is seated by being supported by the bottom surface of the insert attachment seat extending between the ends of the recessed grooves extending to the outer peripheral side.

There are cases where the center of each of the recessed grooves is formed in a circular-arc shape, with the both ends extending radially to the outer peripheral side from the center thereof as described above, and where each of the recessed grooves extends as a whole in a straight line in the tangential direction. In these cases as well, in order to elastically deform evenly a plurality of peripheral wall portions formed between these recessed grooves and the outer peripheral surface of the neck portion, it is desirable that the plurality of recessed grooves be formed at a position of rotational symmetry at every constant angle at the center of the axis line. Here, the plurality of recessed grooves is arranged on individual sides of a regular polygon which is centered on the axis line, in particular where the recessed grooves extend along the tangent.

Further, in order to prevent the breakage of a base end which serves as a supporting point of the thus elastically deforming peripheral wall portion, that is, the groove bottom part of the recessed groove, due to the concentration of stress on deformation, it is desirable that the groove bottom of the recessed groove be formed on a circular cross-section, the diameter of which is larger than a groove width opened on the bottom surface of the recessed groove. Thereby, it is possible to disperse the stress and prevent the breakage on deformation in advance. Still further, as described above, strength and rigidity of the peripheral wall portion are secured on the groove bottom side of the recessed groove. Thereby, a peripheral wall portion formed between the recess groove and the outer peripheral surface of the neck portion is slightly decreased in thickness, thus making it possible to secure a larger amount of elastic deformation on the groove bottom.

As described above, where the peripheral surface of the insert is formed in a circular surface shape and the wall surface of the insert attachment seat is also formed in a circular-arc surface shape, it is impossible to restrain the rotation of the cutting insert by using the notched surfaces. Particularly in this case, it is desirable that a protruding portion which is accommodated into a recess formed on the seating surface of the cutting insert be formed on the bottom surface of the insert attachment seat and the protruding portion be used to restrain the rotation of the cutting insert.

Effects of the Invention

As described so far, according to the rotary cutting tool of the present invention, even where the circular plate-like cutting insert is a peripheral surface non-polished product lower in cost, the peripheral surface continuing to the cutting edge is allowed to be in contact with the wall surface of the insert attachment seat, by which the center of the circular cutting edge can be made to coincide with the axis line of the shank portion of the tool body. Further, the bottom surface of the insert attachment seat is allowed to extend between the ends of adjacent recessed grooves. Thereby, an outer peripheral edge of the seating surface directly below the cutting edge is allowed to be in contact with the above-described bottom surface, thus making it possible to receive cutting resistance which acts on the cutting edge and also improve the cutting insert mounting more stably. As a result, it is possible to perform turning with a high degree of precision without damaging a tool such as by chipping.

BEST MODE FOR CARRYING OUT THE INVENTION

Figure 1:
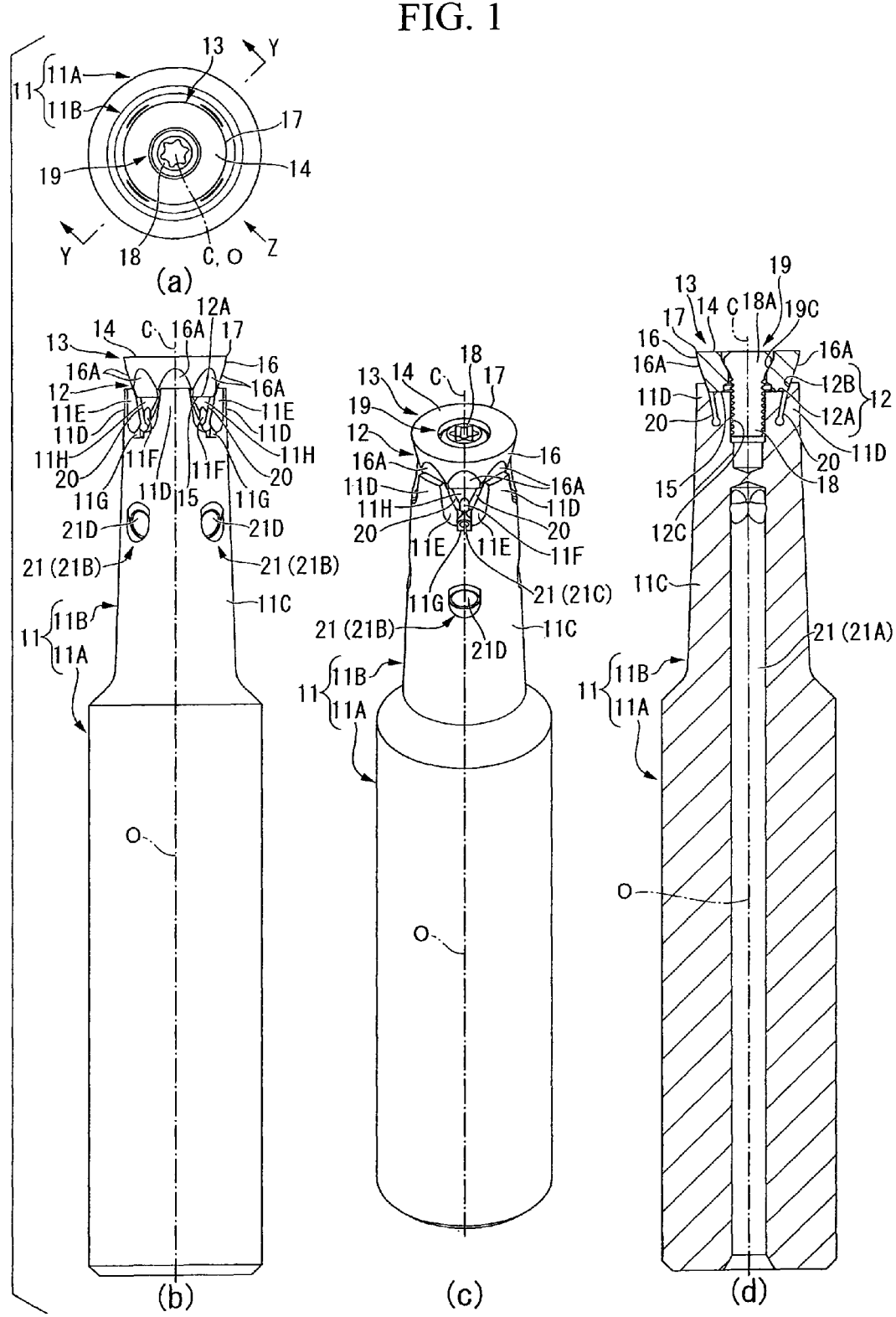
FIG. 1 covers drawings which show a first embodiment of the present invention in which (a) is a plan view thereof when viewed from the leading end side of the axis line O direction, (b) is a side elevational view, (c) is a perspective view and (d) is a longitudinal sectional view.

Hereinafter, an explanation will be made for preferred embodiments of the present invention by referring to the drawings. FIG. 1 through FIG. 6 show the first embodiment of the rotary cutting tool of the present invention. In the present embodiment as well, the tool body 11 is made of steel, etc., the rear end thereof is provided as a shank portion 11A which is formed approximately in a cylindrical shape at the center of the axis line O, and the leading end is made smaller in diameter than the shank portion 11A and provided as a neck portion 11B formed in a tapered long circular truncated cone shape or cylindrical shape which gradually decreases in the outer diameter slightly toward the leading end side.

Then, a cutting insert 13 formed in a circular plate shape at the center of the central axis C is mounted on a recessed insert attachment seat 12 formed on the tip surface (leading end surface) of the neck portion 11B so as to be arranged coaxially. It is to be noted that the neck portion 11B may be formed approximately in a circular truncated cone shape or a cylindrical shape and may be, for example, in a conical shape or a columnar shape having a polygonal cross-section such as a regular dodecagon. Further, in such a manner that the neck portion 11B is not tapered to be smaller in diameter than the shank portion 11A but kept equal in diameter to the shank portion 11A, the insert attachment seat 12 may be formed on the leading end surface thereof.

Figure 2:
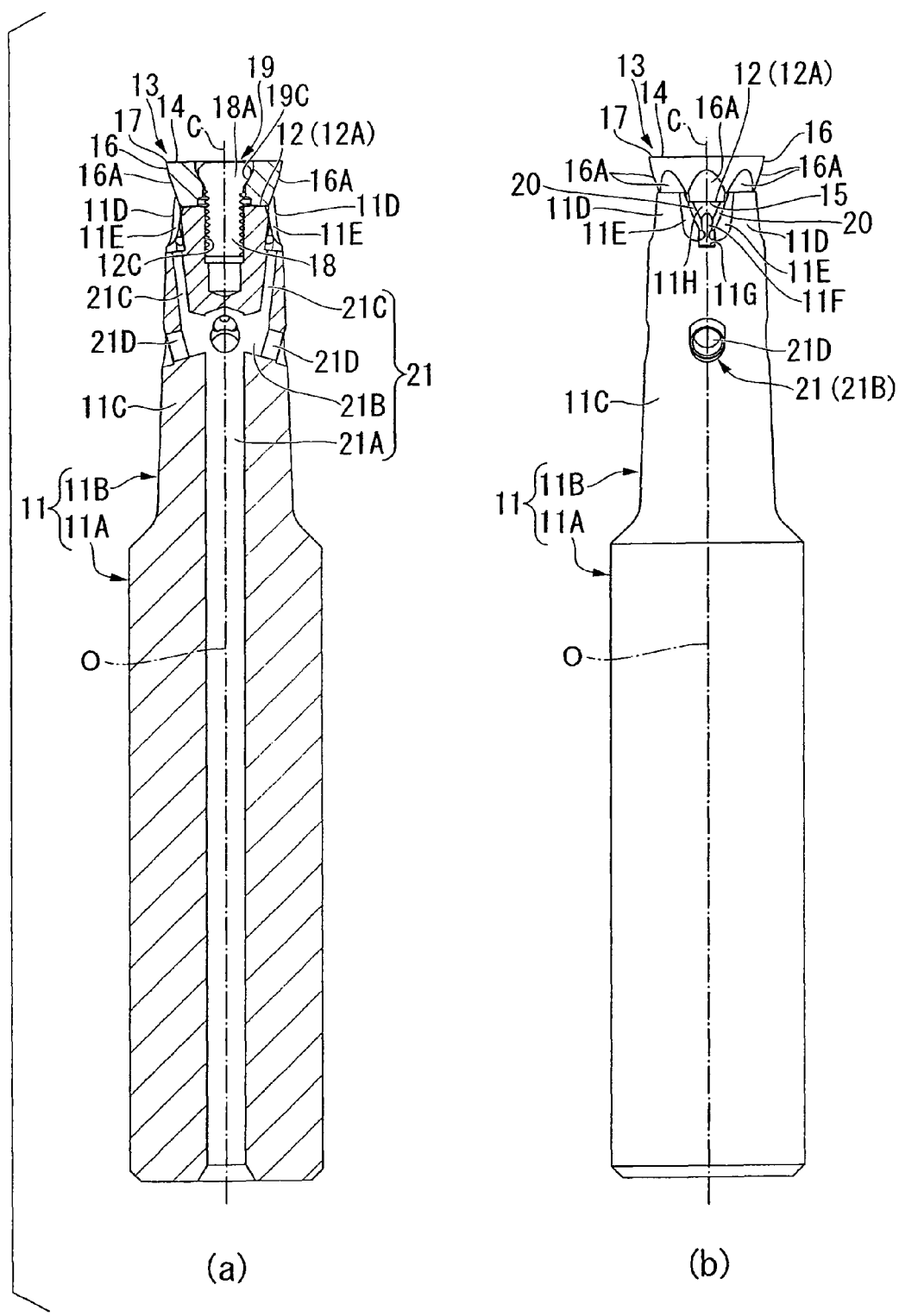
FIG. 2 covers drawings which show the first embodiment of the present invention in which (a) is a sectional view taken along line Y to Y in FIG. 1(a), and (b) is a side elevational view when viewed from the arrow Z direction in FIG. 1(a).

Further, the cutting insert 13 is made of a hard material such as cemented carbide and, as shown in FIG. 1 and FIG. 2, a first circular side surface is provided as a rake face 14 and a second circular side surface is provided as a seating surface 15. Still further, a peripheral surface thereof is provided as a flank 16, and the flank 16 is used as a positive insert having a circular surface formed in a convex conical surface shape so as to gradually decrease in the outer diameter toward the seating surface 15 side. A cutting edge 17 which is centered on the central axis C of the cutting insert 13 to assume a circular shape is formed at a ridge line portion where the flank 16 intersects the rake face 14. The rake face 14 and the seating surface 15 are formed as flat surfaces perpendicular to the central axis C.

Figure 17:
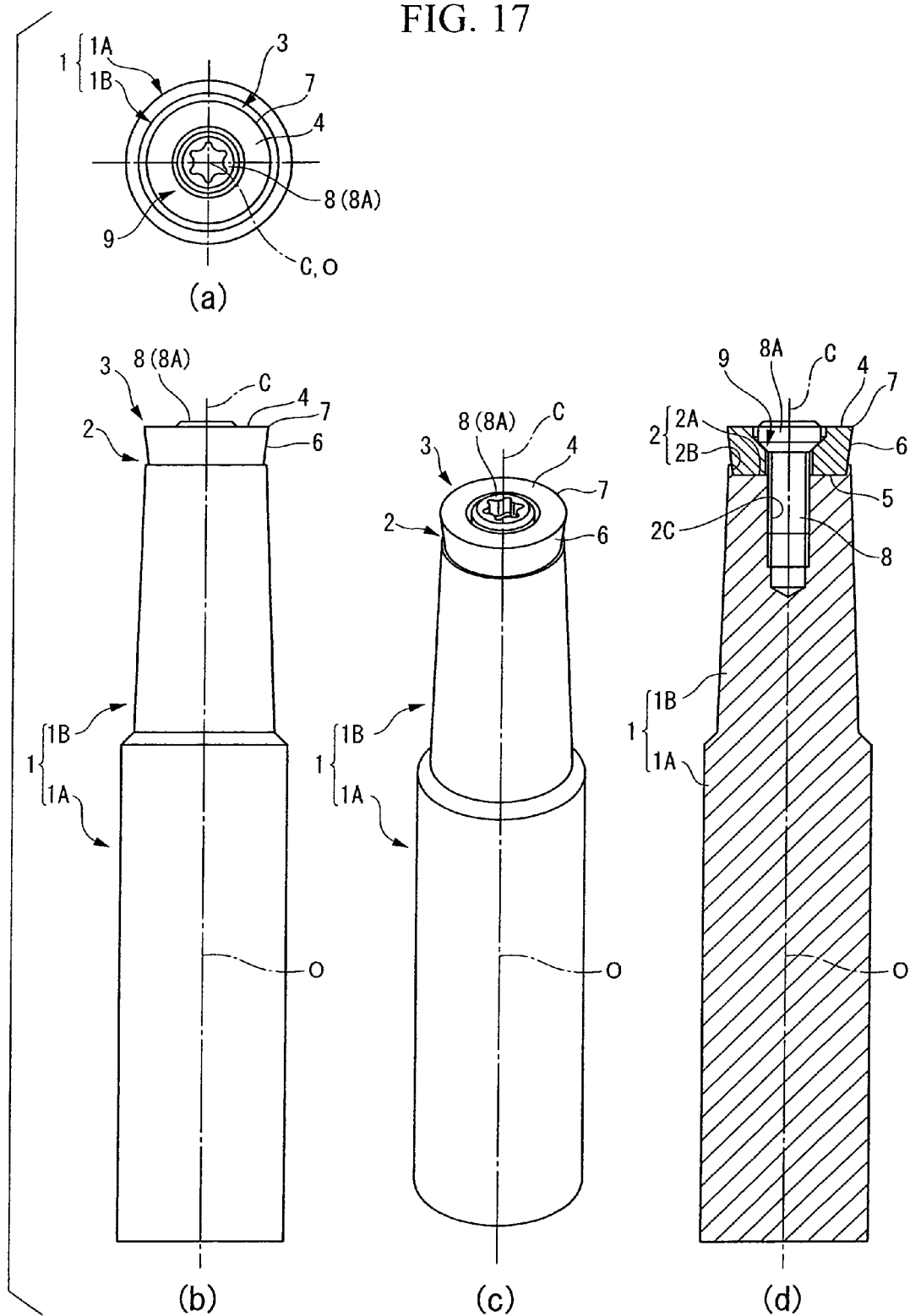
FIG. 17 covers drawings which show one example of a rotary cutting tool attached to a composite processing machine and driven rotationally in which (*a*) is a plan view when viewed from the leading end side of the axis line O direction, (*b*) is a side elevational view, (*c*) is a perspective view and (*d*) is a longitudinal sectional view.
Figure 18:
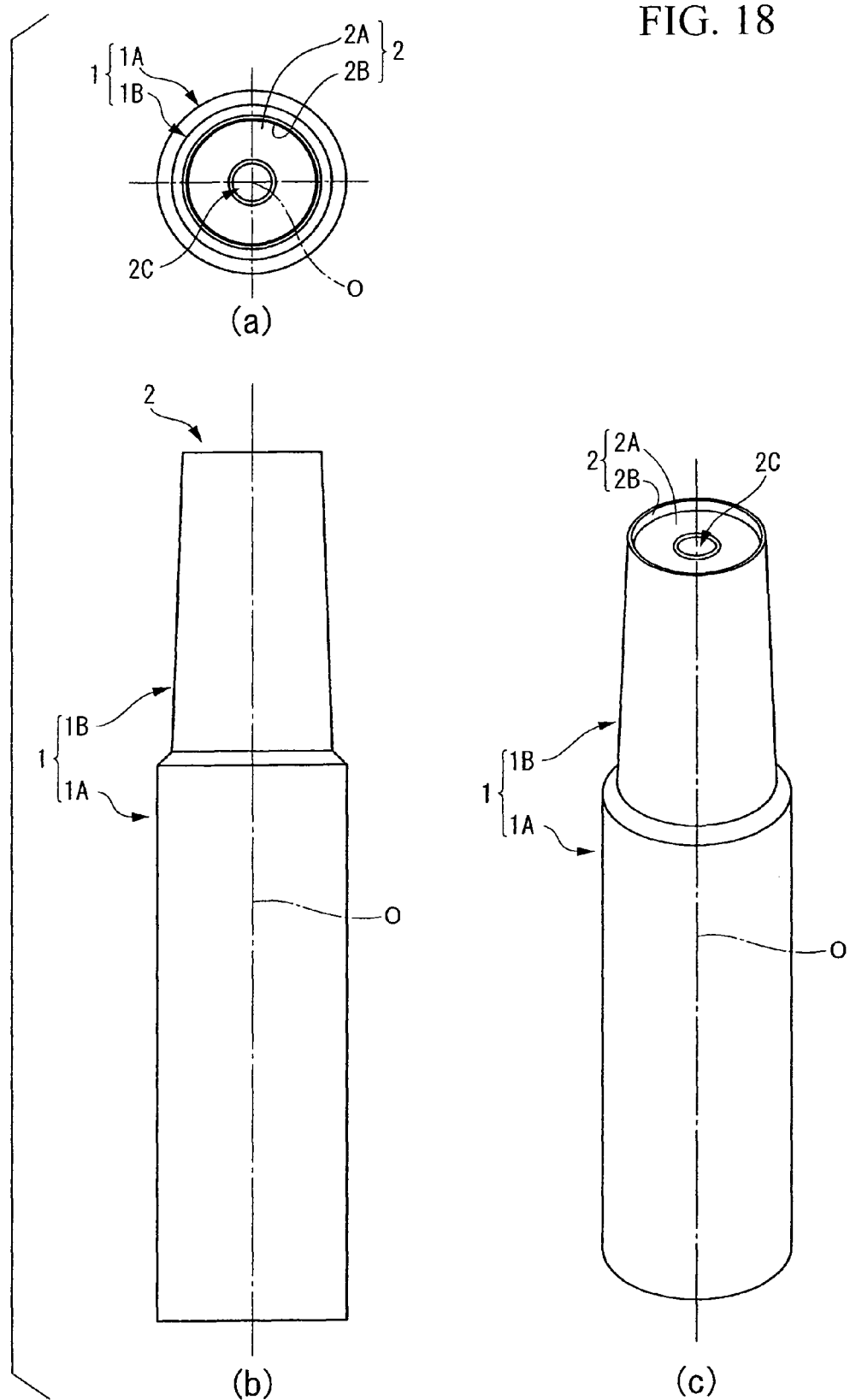
FIG. 18 covers drawings which show a tool body 1 of the rotary cutting tool embodied in FIG. 17 in which (*a*) is a plan view when viewed from the leading end side of the axis line O direction, (*b*) is a side elevational view and (*c*) is a perspective view.

Still further, a mounting hole 19 into which a clamping screw 18 is inserted along the central axis C is formed from the rake face 14 to the seating surface 15. In the present embodiment, the clamping screw 18 is that in which the head portion 18A thereof is formed in a flat countersunk screw head shape as described in the clamping screw 8 of the rotary cutting tool shown in FIG. 17 and FIG. 18. Therefore, a recessed conical surface portion 19C which is centered on the central axis C with which the back surface of the head portion 18A is in contact is formed also at the mounting hole 19 on the side of the rake face 14.

In addition, in the cutting insert 13, a plurality of notched surfaces 16A extending in the tangential direction of a circle which is centered on the central axis C which is coincident with the axis line O of the shank portion 11A are formed in the circumferential direction on the seating surface 15 side of the flank 16 formed in a circular surface shape. That is, in the present embodiment, as described above, the cutting insert 13 is inclined to the seating surface 15 side approximately from the center in the direction of the central axis C of the convex conical surface-like flank 16 which gradually decreases in the outer diameter toward the seating surface 15 from the rake face 14 at an inclination angle larger than an inclination angle with respect to the central axis C of the convex conical surface. Then, as described above, these eight flat surface-like notched surfaces 16A extending in the tangential direction of the circle which is centered on the central axis C are formed at equal intervals in the circumferential direction so as to provide a rotational symmetry every 45° around the central axis C and also in such a manner that ridge lines where the seating surface 15 intersects notched surfaces adjacent in the circumferential direction intersect each other. Therefore, ridge lines where the seating surface 15 intersects the flank 16 including the notched surfaces 16A assume a regular octagon which is centered on the central axis C.

In the present embodiment, the insert attachment seat 12 on which the above-described cutting insert 13 is mounted is also provided with a bottom surface 12A perpendicular to the axis line O which is further recessed from the tip surface to the rear end side in the direction of the axis line O, facing toward the leading end side of the tool body 11, thus opposing to the seating surface 15 of the cutting insert 13, and wall surfaces 12B which extend to the leading end side with respect to the bottom surface 12A and also gradually increase in distance from the axis line O toward the leading end side. Further, a threaded hole 12C into which the clamping screw 18 is screwed is formed along the axis line O at the center of the bottom surface 12A.

However, in the present embodiment, the wall surfaces 12B are formed so as to be in contact with four notched surfaces 16A placed alternately in the circumferential direction, among the eight notched surfaces 16A on the flank 16 of the cutting insert 13. That is, to the leading end side in the direction of the axis line O, the wall surfaces 12B are formed so that the wall surfaces 12B is inclined to the axis line O, thereby moving to the outer peripheral side at an inclination angle smaller by 0.1 to 5° and desirably by about 2° than an inclination angle formed by the notched surface 16A with respect to the central axis C. On the other hand, in the circumferential direction, the wall surfaces 12B are formed so as to assume an inclined flat surface shape extending in the tangential direction of a circle which is centered on the axis line O. The above-described four wall surfaces 12B are arranged so as to provide a rotational symmetry every 90° around the axis line O, corresponding to the four notched surfaces 16A. That is, they are arranged so that a cross-section orthogonal to the axis line O assumes a square.

Then, in the above-described insert attachment seat 12, a plurality of recessed grooves 20 are formed on the bottom surface 12A in such a manner as to extend individually in the circumferential direction of the neck portion 11B, while being recessed from the bottom surface 12A, and also in such a manner as to travel around the insert attachment seat 12 around the axis line O as a whole. Further, each of the recessed grooves 20 is formed in such a manner that the both ends in the circumferential direction are opened from the wall surface 12B of the insert attachment seat 12 to the outer peripheral surface 11C of the neck portion 11B. Still further, each of the recessed grooves 20 is formed in such a manner so as to extend radially to the outer peripheral side with respect to the axis line O from a circle E which is centered on the axis line O in contact with the recessed groove 20 at the center between the both ends (a circle internally in contact with a square formed by four straight lines passing through the center of the groove width of each recessed groove 20 at a position of the bottom surface 12A in the direction of the axis line O) toward the both ends of the recessed groove 20 which are opened on the outer peripheral surface 11C.

Figure 5:
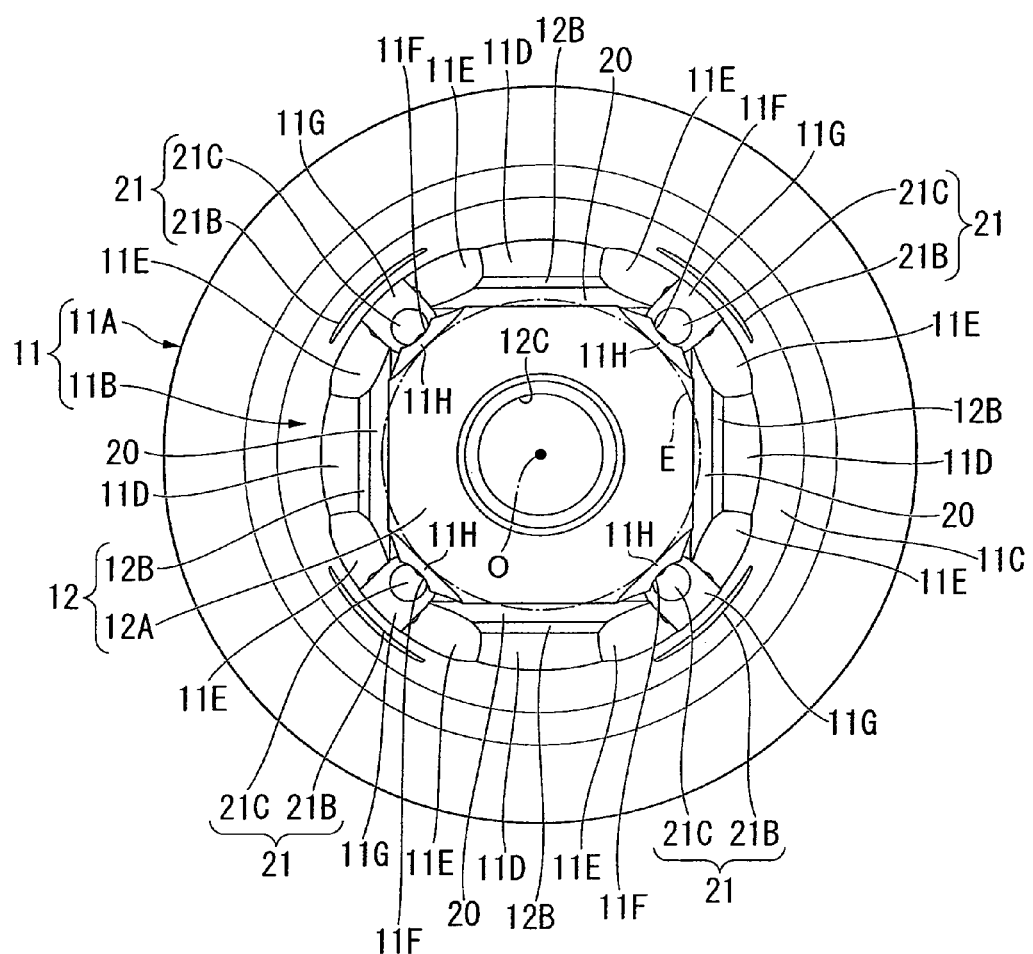
FIG. 5 is an enlarged plan view of an insert attachment seat 12 of the first embodiment of the present invention when viewed from the leading end side of the axis line O direction.

Here, in the present embodiment, each of these recessed grooves 20 is in a slit shape which is formed so as to move to the inner peripheral side with respect to the axis line O in the direction of the axis line O toward the groove bottom side (at the rear end side of the tool body 11) from ridge line portions where the four wall surfaces 12B individually intersect the bottom surface 12A of the insert attachment seat 12 and also so as to extend along the intersecting ridge line portions in the circumferential direction. That is, as shown in FIG. 5, each of the recessed grooves 20 is formed in a straight line over the entire length so as to extend in the circumferential direction of the neck portion 11B along the tangential direction of the circle E which is centered on the axis line O, when viewed from a direction opposite to the bottom surface 12A.

Further, the recessed groove 20 extends in an inclined manner so as to move to the inner peripheral side at a constant inclination angle with respect to the axis line O toward the rear end side in the direction of the axis line O. However, this inclination angle is made slightly smaller than an inclination angle formed by the wall surface 12B of the insert attachment seat 12 with respect to the axis line O. Still further, four recessed grooves 20 are arranged so as to provide a rotational symmetry every 90° around the axis line O, as a whole, assuming approximately a square shape which is externally in contact with the circle E. Then, between the corners of the square, that is, between the mutually opposing ends of the recessed grooves 20 adjacent in the circumferential direction which extend radially to the outer peripheral side with respect to the circle E, the bottom surface 12A of the insert attachment seat 12 extends so as to run off to the outer peripheral side of the circle E.

In the present embodiment, the square made by ridge lines where these recessed grooves 20 intersect the wall surfaces 12B of the insert attachment seat 12 is slightly smaller than a square made by extension lines of the ridge lines where the seating surface 15 intersects these four notched surfaces 16A in a state where the cutting insert 13 is not mounted on the insert attachment seat 12. As shown in FIG. 1(d), in a state where the cutting insert 13 is mounted on the insert attachment seat 12, four peripheral wall portions 11D formed by dividing a space between the recessed grooves 20 and the outer peripheral surface 11C of the neck portion 11B at equal intervals in the circumferential direction are, as will be described later, elastically deformed to the outer peripheral side. Thereby, the wall surfaces 12B are in contact with the notched surfaces 16A. Thus, the ridge lines where these recessed grooves 20 intersect the wall surface 12B of the insert attachment seat 12 are made coincident with the ridge lines where the seating surface 15 of the cutting insert 13 intersects the above-described four notched surfaces 16A.

On the other hand, in the present embodiment, the peripheral wall portion 11D formed between the recessed groove 20 and the outer peripheral surface 11C of the neck portion 11B is formed so as to increase in circumferential width toward the groove bottom side of the recessed groove 20 from the bottom surface 12A. In particular, a circumferential end edge 11E of the peripheral wall portion 11D is formed so as to increase in circumferential width at least on the groove bottom side of the recessed groove 20 as the circumferential end edge 11E moves to the groove bottom side while being recessed and curved. Further, the peripheral wall portion 11D is formed so as to increase in circumferential width at least on the groove bottom side of the recessed groove 20 also as the peripheral wall portion 11D moves radially to the inner peripheral side with respect to the axis line O. In particular, the circumferential end edge 11E of the peripheral wall portion 11D is formed so as to increase in circumferential width at least on the groove bottom side of the recessed groove 20 as the circumferential end edge 11E moves radially to the inner peripheral side with respect to the axis line O while being recessed and curved.

To be more specific, the end edge 11E of the peripheral wall portion 11D is formed so as to provide a recessed curved surface shape by being cut by a ball end mill, etc. The recessed curved surface formed by the end edge 11E is formed so as to extend approximately at a constant inclination with respect to the axis line O up to the middle of a recessed groove 20 passing from the wall surface 12B of the insert attachment seat 12 through the bottom surface 12A in the direction of the axis line O, with the peripheral wall portion 11D being increased in circumferential width at a constant ratio and thereafter so as to extend while being recessed and curved to be cut up in the circumferential direction on the groove bottom side of the recessed groove 20, thereby increasing the circumferential width of the peripheral wall portion 11D at a gradually increasing ratio.

Further, the recessed curved surface formed by the end edge 11E is formed in such a manner that the circumferential width of the peripheral wall portion 11D extends approximately constant radially with respect to the axis line O at a part of the wall surface 12B. On the other hand, the recessed curved surface is formed so as to be recessed and curved also at a cross-section perpendicular to the axis line O, with the peripheral wall portion 11D being gradually increased in circumferential width to the inner peripheral side in the radial direction with respect to the axis line O, from the bottom surface 12A of the insert attachment seat 12 to the groove bottom side of the recessed groove 20. Therefore, a ratio at which the peripheral wall portion 11D increases in circumferential width to the inner peripheral side in the radial direction is gradually increased toward the groove bottom side.

As described above, the end edge 11E of the peripheral wall portion 11D is formed in such a manner that the circumferential width of the peripheral wall portion 11D increases to the groove bottom side of the recessed groove 20 and also to the inner peripheral side in the radial direction. Thereby, between the mutually opposing end edges 11E of the peripheral wall portions 11D adjacent in the circumferential direction, a clearance is formed which decreases in circumferential width to the groove bottom side of the recessed groove 20 and also decreases in circumferential width at a part of recessed groove 20 to the inner peripheral side in the radial direction as well. A wall surface part extending so as to intersect the bottom surface 12A of the insert attachment seat 12 between recessed grooves 20 adjacent in the circumferential direction in the tool body 11 is exposed at this clearance to so as to face the outer peripheral side in the radial direction.

Here, the groove bottom side of the recessed groove 20 at the wall surface part is formed as a recessed wall portion 11F in which a cross-section orthogonal to the axis line O is formed in a recessed curved surface shape so as to be recessed to the inner peripheral side in the radial direction with respect to the axis line O in synchronization with the end edge 11E of the peripheral wall portion 11D formed in a recessed curved surface shape as described above. The recessed wall portion 11F is inclined at a constant inclination angle also in the direction of the axis line O with respect to the axis line O so as to be recessed to the inner peripheral side in the radial direction toward the rear end side from the leading end side of the tool body 11. The inclination angle is made approximately equal to a relief angle of the flank 16 of the cutting insert 13 mounted on the insert attachment seat 12. The flank 16 and the cutting edge 17 are positioned on an extension of the recessed wall portion 11F to the leading end side. A rear end side part of the recessed wall portion 11F in the direction of the axis line O extends beyond the groove bottom of the recessed groove 20 and a rear end edge of the end edge 11E of the peripheral wall portion 11D, thereby positioning slightly further to the rear end side from the end edge 11E. The rear end part intersects a bottom surface portion 11G which is formed approximately in a U letter shape so as to be perpendicular to the recessed wall portion 11F at the rear end part.

On the other hand, regarding the above-described wall surface part, a leading end side part in the direction of the axis line O which intersects the bottom surface 12A of the insert attachment seat 12 is in the present embodiment provided as a chamfered wall portion 11H by being chamfered by a recessed curved surface which is recessed to the inner peripheral side in the radial direction at a curvature radius larger than that of the recessed wall portion 11F on a cross-section orthogonal to the axis line O or by a flat surface. The chamfered wall portion 11H intersects the leading end of the recessed wall portion 11F and inclines to the inner peripheral side in the radial direction at a constant inclination angle with respect to the axis line O toward the leading end side thereof.

Therefore, since the chamfered wall portion 11H extends so as to move to the inner peripheral side in the radial direction with respect to the axis line O as the recessed grooves 20 move to the rear end side in the direction of the axis line O as described above, the chamfered wall portion 11H is formed so as to gradually increase in circumferential width along the leading end side and intersects the bottom surface 12A. Thereby, in the present embodiment, as shown in FIG. 5, the bottom surface 12A assumes approximately a lopsided octagonal shape where corners of the square formed with the recessed grooves 20 are chamfered so as to be a recessed curved line larger in curvature radius or a straight line by the chamfered wall portions 11H.

However, the length of one side of the lopsided octagon formed with ridge lines where the chamfer wall portions 11H intersect the bottom surface 12A is made shorter than the length of one side of the lopsided octagon formed with ridge lines where the recessed grooves 20 intersect the bottom surface 12A. The ridge line where the chamfered wall portion 11H intersects the bottom surface 12A is positioned at the outer peripheral side of the circle E which is centered on the axis line O in contact with a recessed groove 20 at the center of the recessed groove 20 or runs off radially to the outer peripheral side of the circle E so as to be externally in contact with the circle E or intersect therewith. Thereby, between the mutually opposing ends of recessed grooves 20 adjacent in the circumferential direction, the bottom surface 12A of the insert attachment seat 12 which has run off from the circle E to the outer peripheral side extends to the outer peripheral side of the circle E in the radial direction along ridge lines intersecting the chamfered wall portion 11H.

At ridge line portions which intersect the chamfer wall portions 11H of the bottom surface 12A extending to the outer peripheral side in the radial direction as described above, ridge lines are positioned where the seating surface 15 intersects the remaining four notched surfaces 16A between four notched surfaces 16A in contact with the wall surfaces 12B, among the notched surfaces 16A of the cutting insert 13. If a distance from the axis line O up to a ridge line where the bottom surface 12A intersects a chamfered wall portion 11H is equal to or slightly larger than a distance from the central axis C of the cutting insert 13 up to a ridge line where the seating surface 15 intersects a notched surface 16A, an outer peripheral edge of the seating surface 15 at ridge line portions intersecting the above-described remaining four notched surfaces 16A is firmly attached to the bottom surface 12A and in contact therewith in a state where the cutting insert 13 is seated on the insert attachment seat 12, without running off from the lopsided octagon formed by the bottom surfaces 12A.

Figure 6:
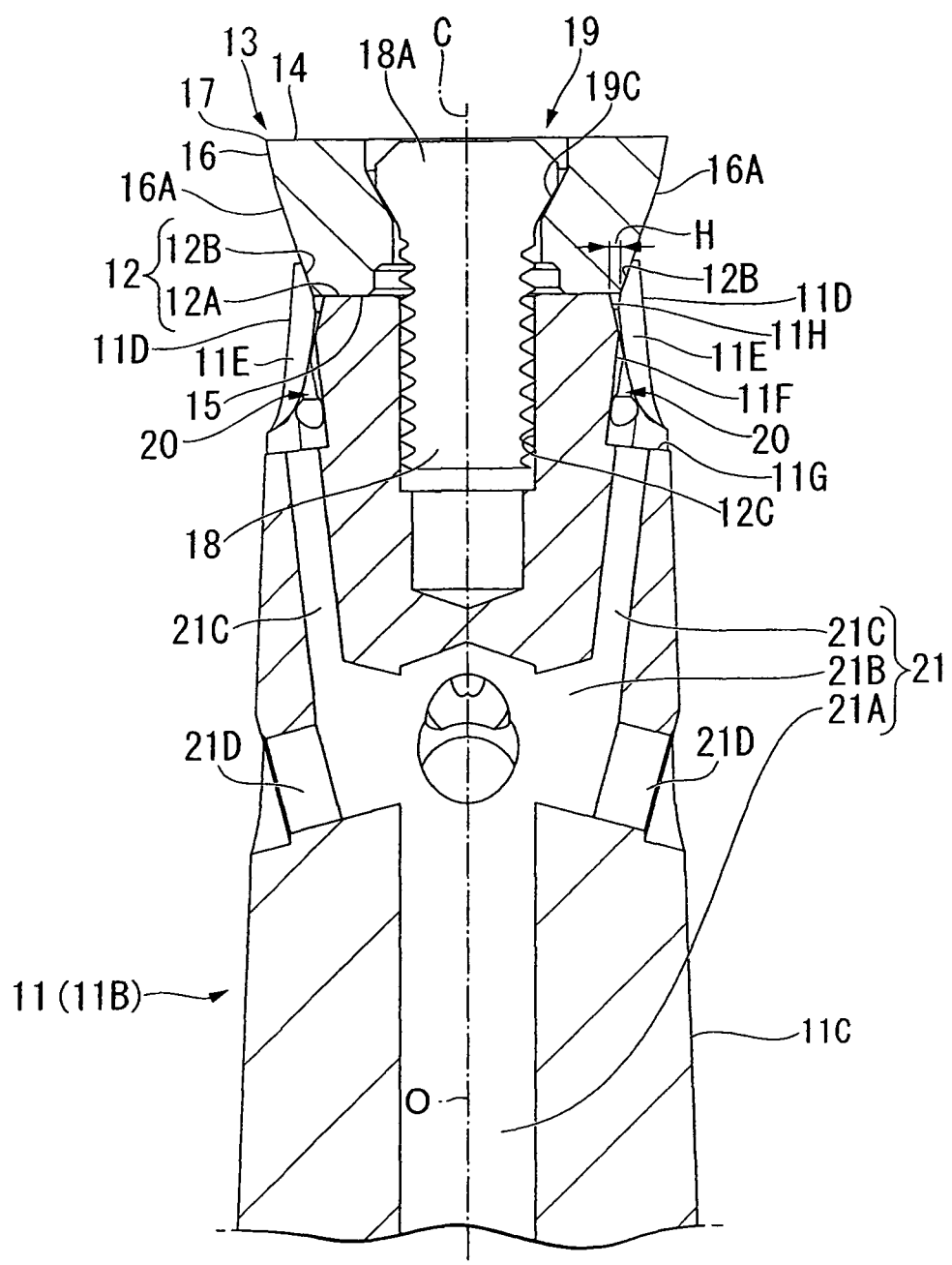
FIG. 6 is an enlarged view of the tool body 11 shown in the sectional view of FIG. 2(a) when viewed at the tip side thereof (on the side of the leading end).
Figure 7:
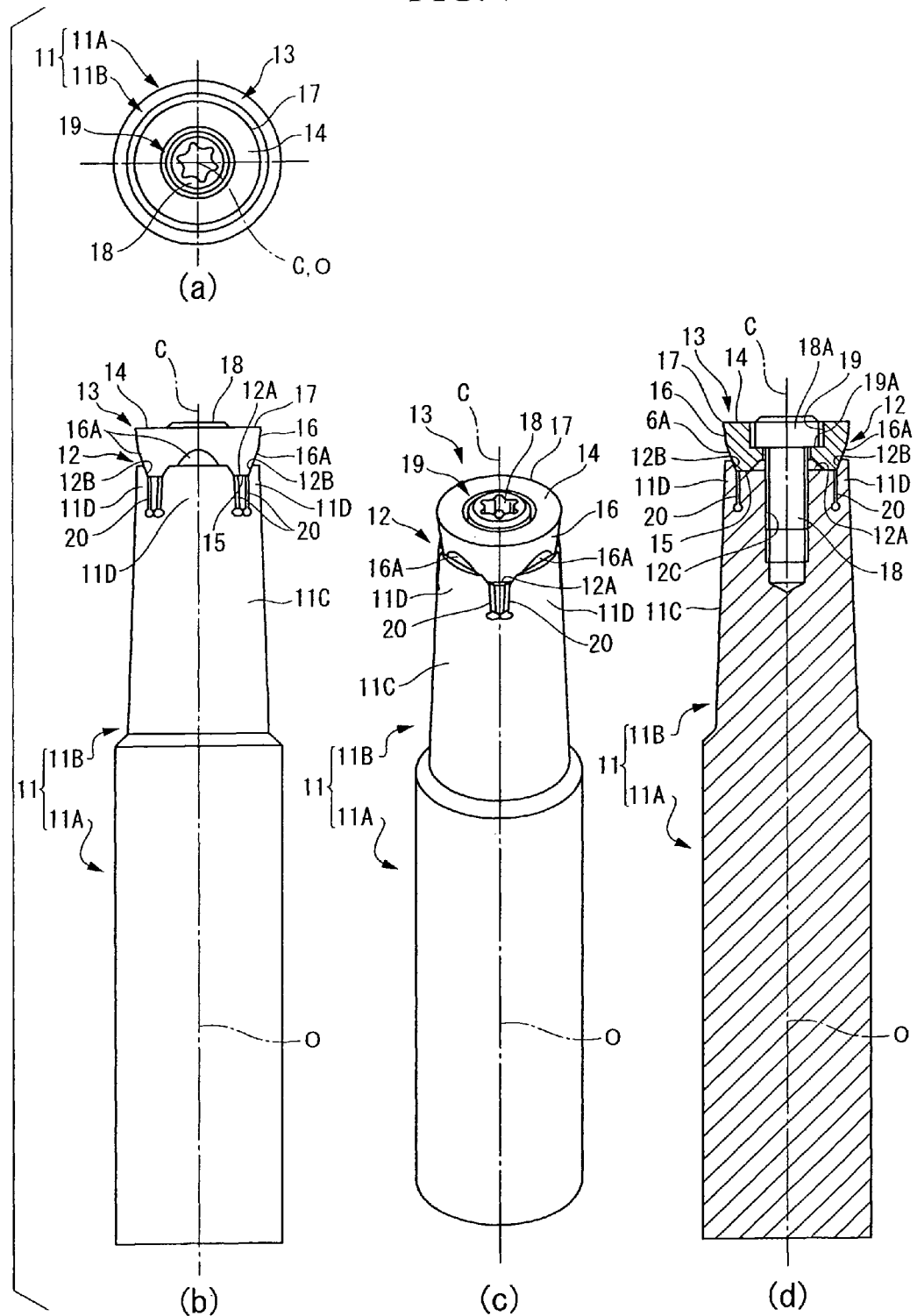
FIG. 7 covers drawings which show a second embodiment of the present invention in which (a) is a plan view when viewed from the leading end side of the axis line O direction, (b) is a side elevational view, (c) is a perspective view and (d) is a longitudinal sectional view.
Figure 8:
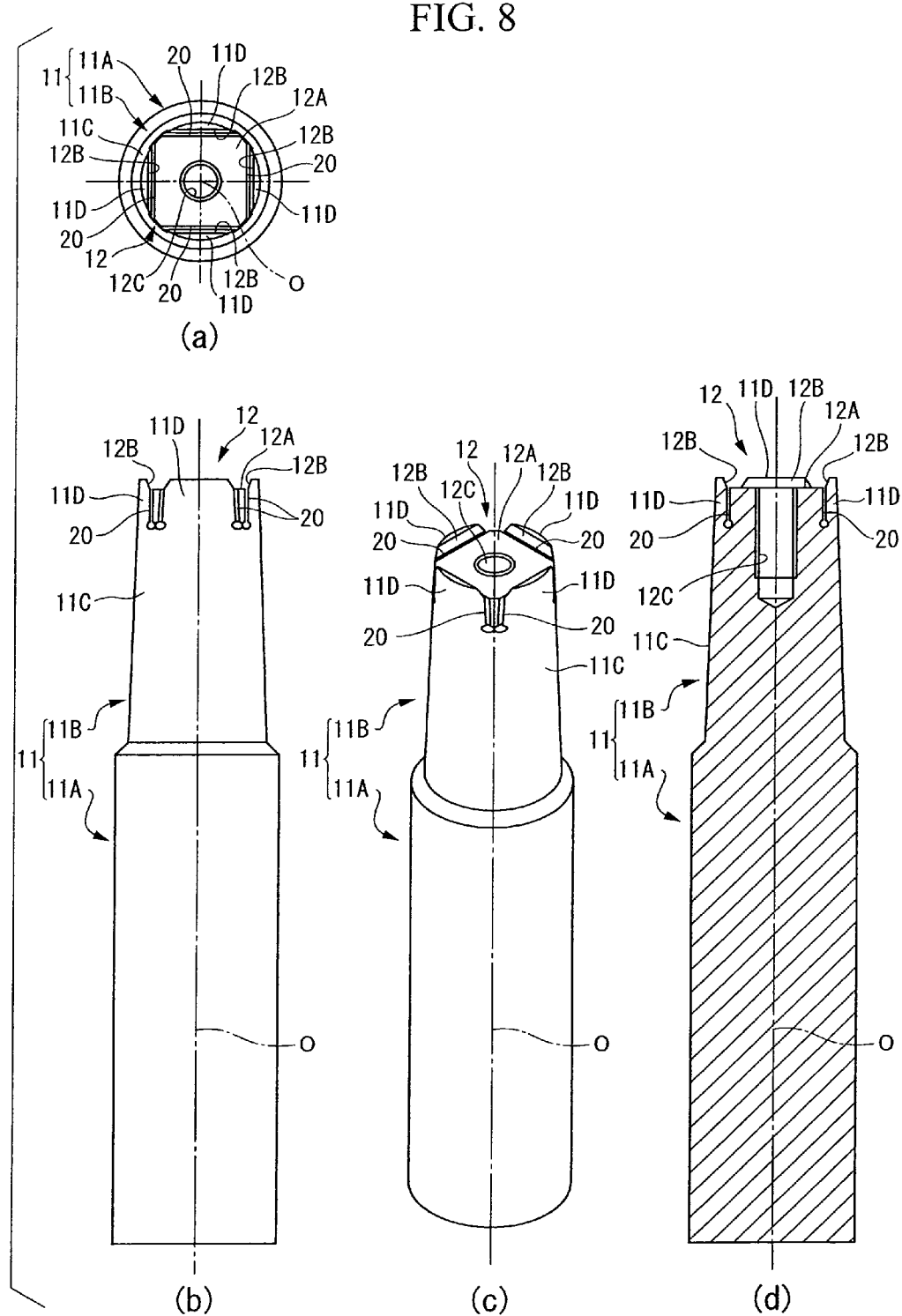
FIG. 8 covers drawings which show a tool body 11 of the second embodiment of the present invention in which (a) is a plan view when viewed from the leading end side of the axis line O direction, (b) is a side elevational view, (c) is a perspective view and (d) is a longitudinal sectional view.
Figure 9:
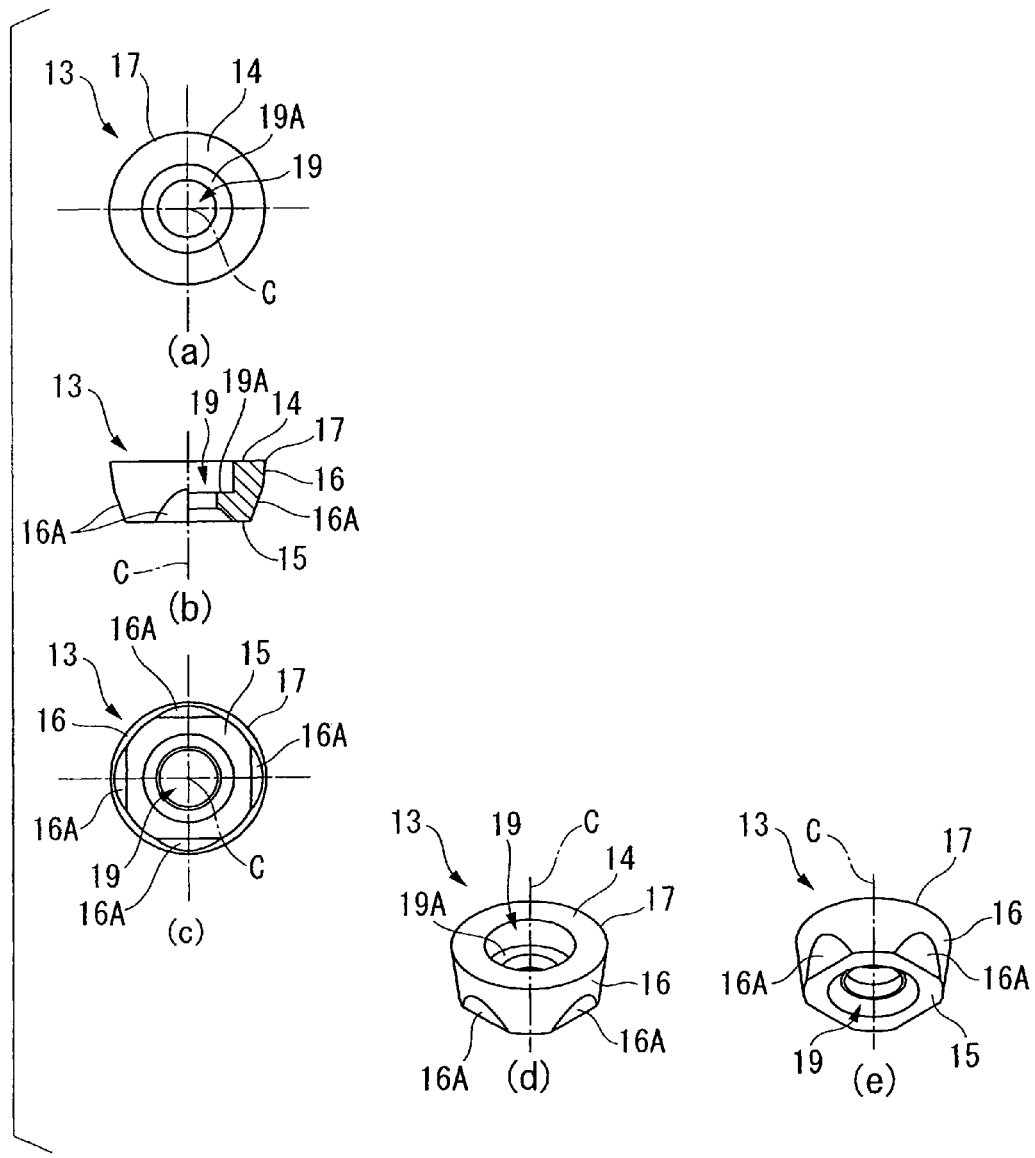
FIG. 9 covers drawings which show a cutting insert 13 of the second embodiment of the present invention in which (*a*) is a plan view when viewed from a rake face 14 side, (*b*) is a partially broken-out side elevational view, (*c*) is a bottom surface drawing when viewed from a seating surface 15 side, (*d*) is a perspective view when viewed from the rake face 14 side and (*e*) is a perspective view when viewed from the seating surface 15.
Figure 10:
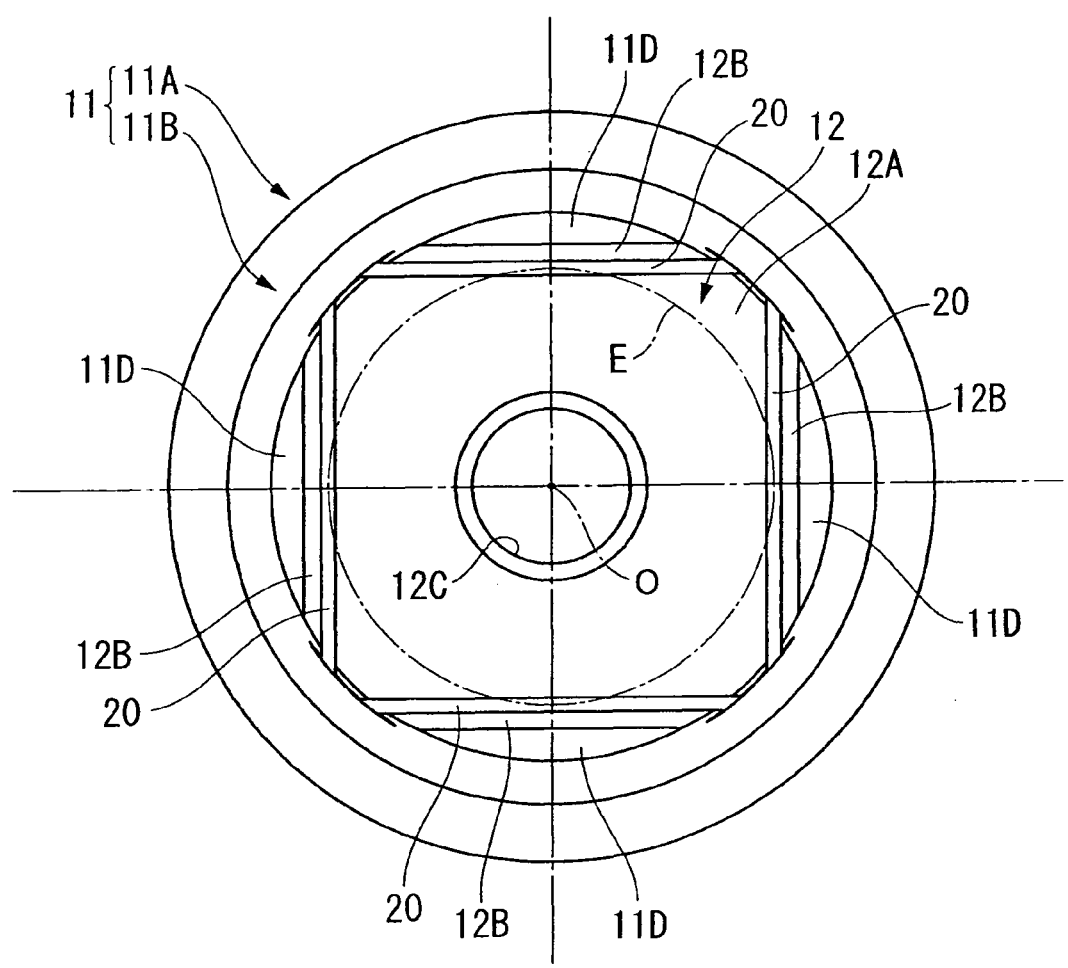
FIG. 10 is an enlarged plan view of an insert attachment seat 12 of the second embodiment of the present invention when viewed from the leading end side of the axis line O direction.

However, in the present embodiment, as shown in FIG. 6, the corners of the square are chamfered by the chamfered wall portions 11H and allowed to move internally. And, for example, in a range H of 1.0 mm or less or preferably in a range H of about 0.5 mm or less which will not affect rigidity on mounting the insert, the seating surface 15 of the cutting insert 13 overhangs so as to run off from the bottom surface 12A. Thereby, the tool body 11 is protected at the part concerned.

Figure 3:
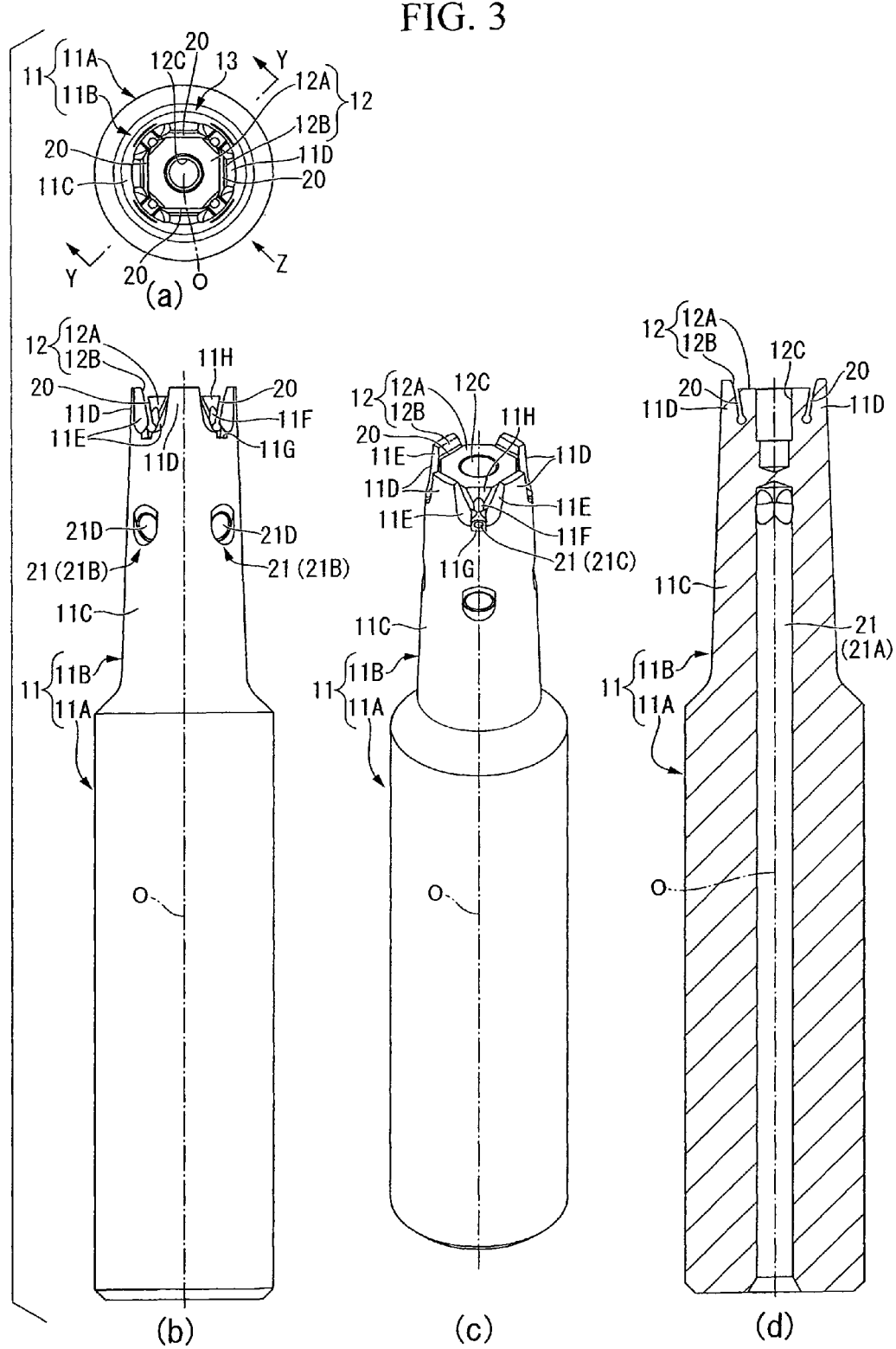
FIG. 3 covers drawings which show a tool body 11 of the first embodiment of the present invention in which (a) is a plan view when viewed from the leading end side of the axis line O, (b) is a side elevational view, (c) is a perspective view and (d) is a longitudinal sectional view.
Figure 4:
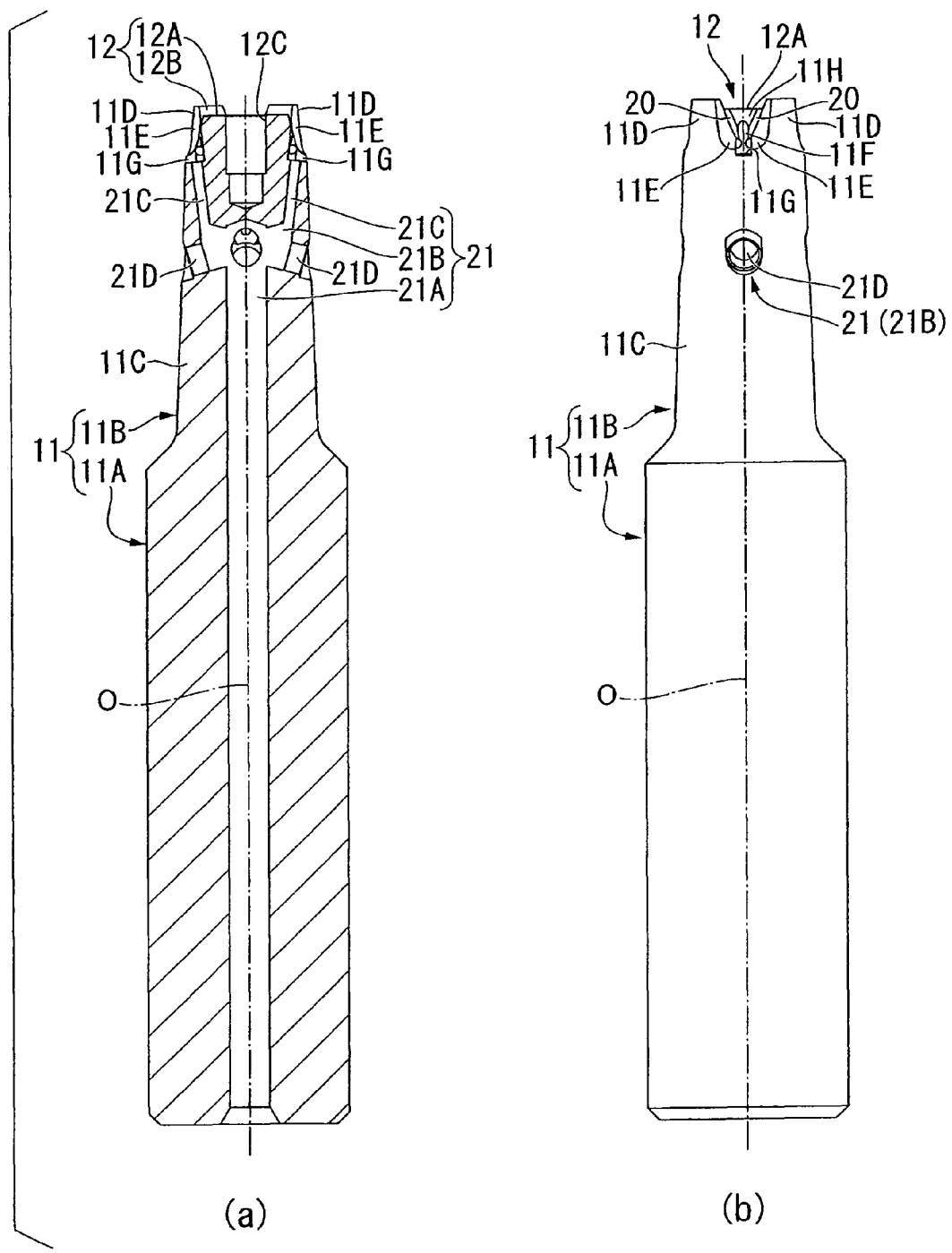
FIG. 4 covers drawings which show the tool body 11 of the first embodiment of the present invention in which (a) is a sectional view taken along line Y to Y in FIG. 3(a) and (b) is a side elevational view when viewed from the arrow Z direction in FIG. 3(a).

As shown in FIG. 1(*d*) and FIG. 3(*d*), each of the recessed grooves 20 is formed so as to extend at a constant width from the side of the bottom surface 12A to the groove bottom side. Then, the recess groove 20 is made slightly larger on the groove bottom than a groove width which is set to be constant and opened to the side of the bottom surface 12A, thereby formed on a circular cross-section larger in diameter than the width of the thus opened groove. Further, the recessed groove 20 is shallower in depth than the threaded hole 12C but made sufficiently larger than, for example, a height of the wall surface 12B from a ridge line where the recessed groove 20 intersects the wall surface 12B to the most tip end of the neck portion 11B.

Further, in the present embodiment, a supply hole 21 for coolant is drilled on the tool body 11. The supply hole 21 is opened on the groove bottom side of the recessed groove 20 at the neck portion 11B between mutually opposing ends of the recessed grooves 20 adjacent in the circumferential direction. In this instance, in the supply hole 21 of the present embodiment, a large diameter hole 21A extends to the leading end side along the axis line O from the rear end surface of the shank portion 11A, that is, the rear end surface of the tool body 11. And the large diameter hole 21A is thereafter diverged into four branching holes 21B slightly moving to the leading end side in the direction of the axis line O to the outer peripheral side in the radial direction before reaching the threaded hole 12C of the neck portion 11B. Still further, an ejection hole 21C smaller in diameter than the branching hole 21B extends from the leading end of each of the branching holes 21B in an inclined manner to the outer peripheral side in the radial direction with respect to the axis line O toward the leading end side, that is, toward the tip side of the neck portion 11B at an inclination angle smaller than an inclination angle of the branching hole 21B with respect to the axis line O. And the ejection hole 21C is opened at the bottom surface portion 11G perpendicularly intersecting the recessed wall portion 11F between the recessed grooves 20.

As shown in FIG. 6, an inclination angle formed by the ejection hole 21B with respect to the axis line O is approximately equal to an inclination angle formed by the recessed wall portion 11F with respect to the axis line O, that is, approximately equal to a relief angle of the flank 16 of the cutting insert 13. As with the recessed wall portion 11F, the flank 16 and the cutting edge 17 are to be positioned on an extension of the ejection hole 21B to the leading end side, and coolant ejected from an opening of the ejection hole 21B is supplied to the flank 16 of the cutting insert 13 and the cutting edge 17.

Further, the branching hole 21B is drilled so as to move slightly to the leading end side in the direction of the axis line O to the inner peripheral side in the radial direction with respect to the axis line O from the outer peripheral surface 11C of the neck portion 11B. After intersecting the large diameter hole 21A, the branching hole 21B is allowed to extend further, thereby extending so as to move slightly to the leading end side in the direction of the axis line O toward the outer peripheral side in the radial direction as described above and stopped before reaching the opposite side of the outer peripheral surface 11C, thereby communicatively connecting to the ejection hole 21C. Still further, an opening on the outer peripheral surface 11C of the branching hole 21B is sealed with a sealing member 21D such as a plug or a filling screw.

The cutting insert 13 is seated on the insert attachment seat 12 formed at the tip of the thus constituted tool body 11, with the seating surface 15 facing toward the bottom surface 12A and also the four notched surfaces 16A arranged alternately in the circumferential direction facing toward the wall surface 12B, so as to make each of them seated opposing each other. Then, the clamping screw 18 which has been inserted into the mounting hole 19 is screwed into the threaded hole 12C, thereby the head portion 18A of the clamping screw 18 presses the recessed conical surface 19C of the mounting hole 19, by which the cutting insert 13 is mounted on the neck portion 11B of the tool body 11. The rotary cutting tool of the present embodiment is thus constituted. Further, in the thus constituted rotary cutting tool, the shank portion 11A of the tool body 11 is retained at a tool retaining portion of a composite processing machine and driven rotationally around the axis line O of the shank portion 11A. And, a work piece is turned by the cutting edge 17 of the cutting insert 13.

Here, in the above-constituted rotary cutting tool, an inclination angle formed by the wall surface 12B of the insert attachment seat 12 with respect to the axis line O is slightly made smaller than an inclination angle formed by the notched surface 16A with respect to the central axis C of the cutting insert 13. Further, a square formed by ridge lines where the wall surfaces 12B intersect the recessed grooves 20 is made slightly smaller than a square formed by ridge lines where the notched surfaces 16A intersect the seating surface 15. Thereby, as described above, in a state where the cutting insert 13 is seated, first, the wall surface 12B is in contact at the leading end edge thereof with the notched surface 16A of the flank 16. Then, the cutting insert 13 is pressed by the head portion 18A of the clamping screw 18, by which the wall surface 12B is pressed to the outer peripheral side, and the peripheral wall portion 11D is elastically deformed so as to be pressed and expanded.

Then, the clamping screw 18 is further screwed into to press the cutting insert 13. And, when the seating surface 15 is in contact with the bottom surface 12A of the insert attachment seat 12 and the wall surface 12B is also firmly attached to the notched surface 16A and in contact therewith, the cutting insert 13 is fixed. Therefore, in a state where the cutting insert 13 is mounted on the insert attachment seat 12, as described above, the peripheral wall portion 11D is elastically deformed, by which the wall surface 12B of the insert attachment seat 12 is firmly attached to the notched surface 16A on the peripheral surface (flank 16) of the cutting insert 13 and in contact therewith. Thereby, it is possible to make the center of the peripheral surface, that is, the central axis C of the cutting insert 13 coincide with the axis line O of the shank portion 11A. Therefore, even if the cutting insert 13 is a peripheral surface non-polished product lower in cost as described previously, the circular cutting edge 17 continuing to the peripheral surface can be precisely arranged at the center of the axis line O of the shank portion 11A which serves as the rotating center of the tool body 11.

Then, in the above-constituted rotary cutting tool, the seating surface 15 of the cutting insert 13 which is mounted thereon is seated in contact with the bottom surface 12A of the insert attachment seat 12 in which outer peripheral edges on the sides of ridge lines which intersect the remaining four notched surfaces 16A between the four notched surfaces 16A in contact with the wall surface 12B extend so as to run off to the outer peripheral side from the circle E between the mutually opposing ends of adjacent recessed grooves 20. Therefore, even if recessed grooves 20 are formed on the bottom surface 12A so as to travel around the insert attachment seat 12, cutting resistance acting on the cutting edge 17 can be received directly by the thus extended bottom surface 12A to secure rigidity on mounting the cutting insert 13 at a part where the ends of the recessed grooves 20 are provided at intervals.

Further, the cutting resistance acting on the cutting edge 17 which is positioned directly above the recessed groove 20 can be dispersed and received by a pair of bottom surfaces 12A extending between the both ends of the recessed groove 20 and the respective ends of the recessed grooves 20 adjacent in the circumferential direction. Therefore, according to the above-constituted rotary cutting tool, it is possible to secure high rigidity against the cutting resistance on mounting the insert extending over the entire length of the circular cutting edge 17 and stably perform turning with a high degree of precision. Thus, the cutting insert 13 is mounted stably, making it possible to prevent damaging a tool such as chipping a cutting edge 17.

Further, in the rotary cutting tool of the present embodiment, in a state where the cutting insert 13 is mounted on the insert attachment seat 12, the outer peripheral edges on the sides of ridge lines which intersect the remaining four notched surfaces 16A on the seating surface 15 of the cutting insert 13 overhang so as to run off from the bottom surface 12A of the insert attachment seat 12 extending between the mutually opposing ends of recessed grooves 20, as described above. Therefore, the flank 16 (notched surface 16A) of the cutting insert 13 which is made of hard cemented carbide, etc., can be used to protect a ridge line portion where the bottom surface 12A of the tool body 11 made of steel, etc., softer than the cemented carbide intersects a chamfered wall portion 11H. Therefore, the chamfered wall portion 11H, etc., which are exposed between the mutually opposing ends of the recessed grooves 20 spaced in the circumferential direction from a clearance between the mutually opposing end edges 11E of the peripheral wall portion 11D can be prevented from being damaged or deformed by chips made when cutting. And, the cutting insert 13 can be seated and mounted more stably.

However, an excessively large overhung amount H from the overhung bottom surface 12A of the seating surface 15 will, as described above, loosen the support of the cutting insert 13 by the bottom surface 12A of the insert attachment seat 12 extending between the mutually opposing ends of the recessed grooves 20, which may affect stable seating of the cutting insert. Therefore, where the cutting insert 13 is overhung and mounted, it is desirable that the seating surface 15 overhang so as to run off from the bottom surface 12A of the insert attachment seat 12 in an overhung amount H in a range of 1.0 mm or less and preferably 0.5 mm or less, as described in the present embodiment.

On the other hand, in the present embodiment, each of the recessed grooves 20 is formed in an inclined manner so as to extend to the inner peripheral side in the radial direction with respect to the axis line O of the tool body 11 toward the groove bottom side of the recessed groove 20 from the bottom surface 12A of the insert attachment seat 12. Thereby, the peripheral wall portion 11D is made relatively small in thickness in the radial direction at the tip side of the peripheral wall portion 11D where the wall surfaces 12B of the insert attachment seat 12 in contact with the notched surfaces 16A of the cutting insert 13 are formed, thereby making it possible to cause elastic deformation easily. On the groove bottom side of the recessed groove 20 opposite thereto, the peripheral wall portion 11D is increased in radial thickness to secure strength and rigidity sufficiently at the peripheral wall portion 11D. It is, thereby, possible to mount the cutting insert 13 reliably and stably. Further, in the present embodiment, an inclination angle formed by the inclined recessed groove 20 with respect to the axis line O is made smaller than an inclination angle formed by the wall surface 12B of the insert attachment seat 12. Therefore, elastic deformation is not prevented more than necessary on the groove bottom side of the peripheral wall portion 11D which is increased in radial thickness. In the present embodiment, the recessed groove 30 is inclined at a constant inclination angle with respect to the axis line O to the inner peripheral side in the radial direction toward the groove bottom side. However, for example, the inclination angle is gradually decreased along the groove bottom side and a cross-section of the recessed groove 30 along the axis line O may be formed so as to provide a convex curve line which is raised to the inner peripheral side in the radial direction with respect to the axis line O. Further, in contrast thereto, the inclination angle is gradually increased to the groove bottom side, and a cross-section of the recessed groove 30 along the axis line O may be formed so as to provide a convex curve line which is raised to the outer peripheral side in the radial direction with respect to the axis line O. However, even where the cross-section of the recessed groove 30 is formed in a curved line, it is desirable that the wall surface 12B of the insert attachment seat 12 be formed in an inclined flat surface shape, the inclination angle of which is kept constant as described above.

Further, in the present embodiment, the peripheral wall portion 11D formed between each of the recessed grooves 20 and the outer peripheral surface 11C of the neck portion 11B is formed so as to increase in circumferential width toward the groove bottom side of the recessed groove 20 from the bottom surface 12A of the insert attachment seat 12. Thereby, it is also possible to secure strength and rigidity of the peripheral wall portion 11D on the groove bottom side of the recessed groove 20 and reliably retain the cutting insert 13 so as to be coaxial with the axis line O of the tool body 11 by increasing a displacement amount by elastic deformation on the wall surface 12B of the insert attachment seat 12 at the tip side of the tool body 11. Still further, the peripheral wall portion 11D is formed in such a manner that the end edge 11E thereof is recessed and curved on the groove bottom side of the recessed groove 20 and cut out in the circumferential direction to increase in width. Thereby, since a ratio at which the peripheral wall portion 11D is increased in width can be made larger on the groove bottom side, it is possible to secure strength and rigidity of the peripheral wall portion 11D more reliably on the groove bottom side.

Still further, in the present embodiment, the peripheral wall portion 11D is formed so as to be approximately constant in circumferential width to the axis line O in the radial direction, on the wall surface 12 part of the insert attachment seat 12, while formed on the groove bottom side of the recessed groove 20 so as to increase in circumferential width along the inner peripheral side in the radial direction. In particular, on the groove bottom side, the end edge 11E is formed so as to be recessed and curved at a cross-section orthogonal to the axis line O, by which a ratio at which the circumferential width is increased to the inner peripheral side in the radial direction can be made larger on the groove bottom side. Therefore, according to the present embodiment, as described above, since the recessed groove 20 is inclined and the circumferential width of the peripheral wall portion 11D is increased to the groove bottom side, it is possible to secure strength and rigidity of the peripheral wall portion 11D more reliably and mount the cutting insert 13 precisely by keeping the displacement amount of elastic deformation on the insert attachment seat 12 side.

In addition, in the present embodiment, the groove bottom of the recessed groove 20 is formed in a circular shape, the cross-section of which has a larger diameter than a groove width opened on the bottom surface 12A of the recessed groove 20. Therefore, it is possible to prevent the concentration of stress on deformation at a groove bottom part thereof which serves as a supporting point on elastic deformation of the peripheral wall portion 11D. And, it is also possible to prevent the peripheral wall portion 11D from being broken due to the concentration of stress. As described above, the groove bottom is formed in a circular shape, the cross-section of which is larger in diameter. Thereby, the groove bottom and the outer peripheral surface 11C of the neck portion 11B can be decreased in thickness. It is thus possible to secure a larger amount of elastic deformation of the peripheral wall portion 11D and cope with a greater dimensional change in the cutting insert 13.

Here, it is possible to form the recessed grooves 20 having the above-described shape of the groove bottom in a single cutting process for one recessed groove 20, for example, by using a ball end mill-like tool in which a spherical cutting edge portion equal in diameter to a circle formed by the cross-section of the groove bottom part is formed at the leading end of an axial cutting edge portion having a diameter equal to the groove width opened on the bottom surface 12A of the recessed groove 20 and delivering the tool from the outer peripheral surface 11C of the neck portion 11B along a tangent of the circle E, with the tool kept parallel with the axis line O.

On the other hand, in the present embodiment, the supply hole 21 for coolant is drilled on the tool body 11 to supply the coolant via the supply hole 21 from the tool body 11. Thereby, as compared with the supply of coolant via a nozzle, etc., from outside a rotary cutting tool, the coolant can be supplied reliably to the cutting edge 17 and a cut site of a work piece without being prevented by chips, etc. Then, in the supply hole 21 of the present embodiment, the ejection hole 21C is opened between the mutually opposing ends of recessed grooves 20 adjacent in the circumferential direction to eject the coolant on the groove bottom side of the recessed groove 20 at the neck portion 11B of the tool body 11. Therefore, it is possible to supply the coolant more reliably through the clearance between the end edges 11E of adjacent peripheral wall portions 11D between the mutually opposing ends of the recessed grooves 20.

Further, at the shank portion 11A of the tool body 11, the supply hole 21 is that in which the large diameter hole 21A is drilled along the axis line O. Therefore, the shank portion 11A can be kept constant in radial thickness to prevent the strength and rigidity thereof from being partially different. Further, in a working machine side such as the above-described composite processing machine, a grip portion which holds the shank portion 11A may be provided with a coolant supplying hole communicatively connecting to the supply hole 21A on the axis line O which serves as the rotating center of a rotary cutting tool. Thereby, where the rotary cutting tool is held at the grip portion, a necessity is eliminated for providing means for aligning the rotating position of the above-described insertion hole with that of the supply hole 21, thereby simplifying a device mechanism.

On the other hand, the supply hole 21 for coolant is drilled at the neck portion 11B of the tool body 11 so as to incline to the outer peripheral side in the radial direction with respect to the axis line O as the ejection hole 21C moves to the tip side of the neck portion 11B, that is, to the leading end side of the tool body 11 on which the cutting insert 13 is mounted. Thereby, as described above, it is possible to supply the coolant reliably and efficiently at the shank portion 11A from the large diameter hole 21A formed so as to run along the axis line O to the cutting edge 17 of the cutting insert 13 formed in a circular shape at the center of the axis line O.

In particular, in the present embodiment, the cutting insert 13 is a positive insert. Further, the ejection hole 21C and the recessed wall portion 11F extending from the opening thereof to the leading end side are inclined at an inclination angle approximately equal to a relief angle of the flank 16 of the cutting insert 13, thereby the flank 16 and the cutting edge 17 are positioned on the extension thereof. As a result, it is possible to supply coolant more reliably and efficiently to the cutting edge 17 and a cut site of a work piece.

Further, in the present embodiment, each of the above-described plurality of recessed grooves 20 is formed in a straight line so as to extend in the tangential direction of the circle E at the center of the axis line O of the shank portion 11A. Therefore, the process by the above-described ball end mill-like tool in the tangential direction is able to form each of the recessed grooves 20 relatively easily and with a high degree of precision. Thus, as described above, it is possible to arrange the cutting edge 17 at the center of the axis line O at a higher degree of precision and perform turning at a higher degree of precision.

Still further, in the cutting insert 13 of the present embodiment, a plurality of inclined flat surface-like notched surfaces 16A which extend in the tangential direction of the circle at the center of the central axis C are formed in the circumferential direction on the seating surface 15 side of a peripheral surface which serves as the flank 16. And, the wall surface 12B of the insert attachment seat 12 is also formed in an inclined flat surface shape extending in the tangential direction of the circle at the center of the axis line O. As described above, the cutting insert 13 is mounted, with these notched surfaces 16A being in contact with the wall surfaces 12B, thereby the rotation of the cutting insert 13 can be restrained even if cutting loads act so as to rotate the cutting insert 13 around the axis line O. Thus, it is possible to prevent the clamping screw 18 from being loosened or in contrast, screwed into tightly by the rotation of the cutting insert 13.

In addition, in the present embodiment, the plurality of recessed grooves 20 are arranged at a position of rotational symmetry at a constant angle of every 90° at the center of the axis line O, thereby assuming a square shape. Therefore, a plurality of peripheral wall portions 11D formed between these recessed grooves 20 and the outer peripheral surface 11C of the neck portion 11B are formed in such a manner that a cross-section orthogonal to the axis line O is equal in dimensions and shape. It is thus possible to elastically deform the plurality of peripheral wall portions 11D formed as described above more evenly to the outer peripheral side in the radial direction and position the cutting insert 13 more reliably at the center of the axis line O.

Then, FIG. 7 to FIG. 10 show the second embodiment of the rotary cutting tool in the present invention. Constituents commonly used in the first embodiment will be denoted the same reference numerals to simplify the explanation. In the present embodiment, first, regarding a clamping screw 18 for fixing a cutting insert 13, a head portion 18A thereof is not like a flat countersunk screw head shape as shown in the clamping screw 18 of the first embodiment or in the clamping screw 8 of the rotary cutting tool in FIG. 17 and FIG. 18 but that which has a flat annular back surface. Therefore, an annular flat surface 19A perpendicular to the central axis C with which the back surface is in contact is formed on the side of a rake face 14 also at a mounting hole 19 of a cutting insert 13.

Further, in the cutting insert 13, four notched surfaces 16A extending in the tangential direction of a circle which is centered on the central axis C coincident with the axis line O of a shank portion 11A are formed at equal intervals on a seating surface 15 side of a circular surface-like flank 16 in the circumferential direction so as to provide a rotational symmetry every 90° around the central axis C. Therefore, in the present embodiment, ridge lines where the notched surfaces 16A intersect the flank 16 including the seating surface 15 and notched surfaces 16A assume a shape in which four corners of a square notched by the notched surfaces 16A are chamfered by circular arcs which are centered on the central axis C.

Still further, in the present embodiment, recessed grooves 20 formed on the insert attachment seat 12 are formed so as to be recessed to the rear end side of a tool body 11 parallel with the axis line O from the respective ridge line portions where the bottom surfaces 12A of the insert attachment seat 12 intersect the four wall surfaces 12B. Further, end edge 11E which is recessed and curved as described in the first embodiment at a peripheral wall portion 11D formed between each of the recessed grooves 20 and a neck portion 11B is not formed. Thus, the peripheral wall portion 11D of the second embodiment is approximately constant in width in the direction of the axis line O except a part at which the wall surface 12B of the insert attachment seat 12 is formed. Further, in the present embodiment, the supply hole 21 of coolant on the tool body 11 is not formed.

Still further, in the present embodiment, the mutually opposing ends of the recessed grooves 20 adjacent in the circumferential direction are formed so as to be spaced slightly also at an outer peripheral surface 11C of a neck portion 11B. Therefore, the outer peripheral surface 11C of the neck portion 11B approximately in a cylindrical shape or a conical surface shape remains between these ends. In the present embodiment, the bottom surface 12A of the insert attachment seat 12 between the mutually opposing ends of the recessed grooves 20 also extends to the outer peripheral surface 11C remaining between the mutually opposing ends of the recessed grooves 20 so as to intersect. Thereby, the bottom surface 12A is formed in such a manner that corners of a square formed by ridge lines intersecting the recessed grooves 20 are formed in an s shape so as to be chamfered in a circular arc shape at the center of the axis line O along the outer peripheral surface 11C of the neck portion 11B.

In addition, as described above, a radius of a circular-arc part of the bottom surface 12A extending to the outer peripheral side in the radial direction from the axis line O is made equal to or slightly larger than a radius of the circular arc formed by a ridge line intersecting the flank 16 between the seating surface 15 of the cutting insert 13 and the notched surface 16A from the central axis C. Thereby, an outer peripheral edge of the seating surface 15 at the circular arc part is firmly attached to the bottom surface 12A and in contact therewith out running off from the circular arc-like part of the bottom surface 12A in a state where the cutting insert 13 is seated on the insert attachment seat 12. However, as with the first embodiment, the circular arc-like part is chamfered and moved inside, thereby the seating surface 15 of the cutting insert 13 overhangs so as to run off from the bottom surface 12A, for example, in a range of 1.0 mm or less, preferably in a range of about 0.5 mm or less to an extent that will not affect rigidity on mounting the insert, by which the tool body 11 may be protected at the part concerned.

In the thus constituted second embodiment, the back surface of the head portion 18A of the clamping screw 18 and the flat surface 19A of the mounting hole 19 of the cutting insert 13 are perpendicular to the axis line O. Therefore, the cutting insert 13 can be adjusted finely for a radial position with respect to the axis line O. Thus, when the cutting insert 13 seated on the insert attachment seat 12 is pressed to the bottom surface 12A by screwing the clamping screw 18, the cutting insert 13 is finely adjusted for the position in such a manner that counter force of the elastically deformed peripheral wall portion 11D is balanced in the radial direction behind the axis line O. That is, the peripheral wall portion 11D is kept equal in the amount of elastic deformation and the four wall surfaces 12B are firmly attached to the four notched surfaces 16A evenly and in contact therewith. The centers of the squares formed at cross-sections where the wall surface 12B and the notched surface 16A are orthogonal respectively to the axis line O and the central axis C, that is, the axis line O and the central axis C, are positioned so as to be coaxial.

Therefore, in the above-constituted rotary cutting tool, even if the flank (peripheral surface) including the notched surface 16A of the cutting insert 13 made of cemented carbide, etc., is a peripheral surface non-polished product which is sintered as it is and, for example, the center of the mounting hole 19 is not strictly coincident with the central axis C of the cutting insert 13 which is the center of the circular cutting edge 17, it is possible to precisely dispose the cutting edge 17 at the center of the axis line O of the shank portion 11A of the tool body 11.

In the second embodiment, as shown in FIG. 7(d), in a state where the cutting insert 13 is mounted on the insert attachment seat 12, a ridge line where the seating surface 15 intersects a notched surface 16A of the cutting insert 13 is made coincident with a ridge line where a wall surface 12B of the insert attachment seat 12 intersects a recessed groove 20. However, if the recessed groove 20 extends so as to move to the outer peripheral side in the radial direction at the both ends with respect to the circle E in contact with the center thereof, for example, as shown in the first modified example of the second embodiment in FIG. 11(a), at the center thereof, a ridge line where the notched surface 16A of the cutting insert 13 intersects the seating surface 15 may be coincident with a ridge line where the bottom surface 12A of the insert attachment seat 12 intersects the recessed groove 20. That is, a whole part of the seating surface 15 may be firmly attached on the bottom surface 12A and in contact therewith.

Figure 11:
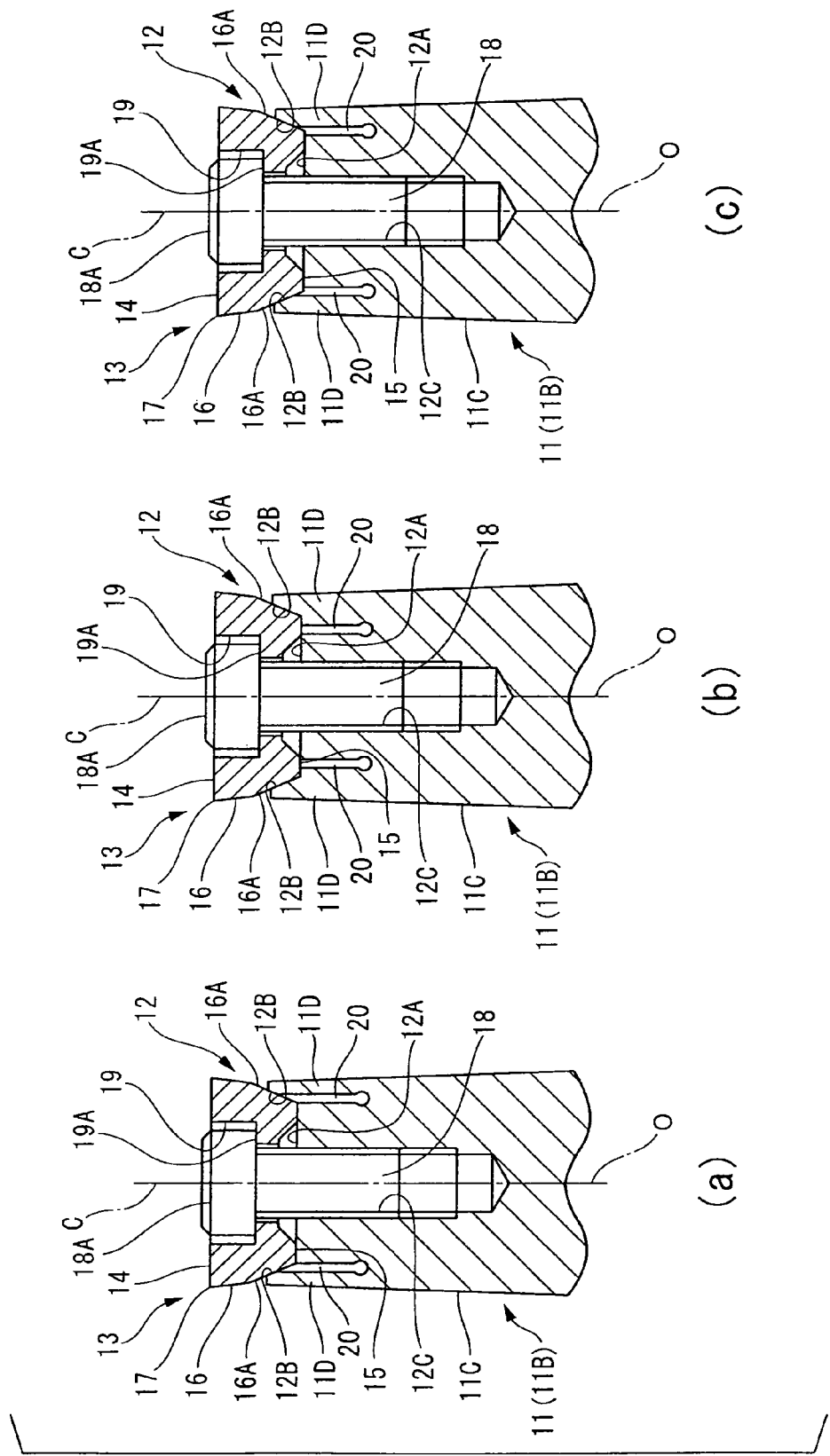
FIG. 11 covers partial longitudinal sectional views in which (*a*) is a first modified example of the second embodiment of the present invention, (*b*) is a second modified example and (*c*) is a third modified example.

Further, as described in the second modified example of the second embodiment shown in FIG. 11(b), each of the recessed grooves 20 may be formed so as to be recessed from the bottom surface 12A more internally than a ridge line where the bottom surface 12A of the insert attachment seat 12 intersects the wall surface 12B. In this instance, the bottom surface 12A remains also on the peripheral wall portion 11D between the recessed groove 20 and the outer peripheral surface 11C of the neck portion 11B. Therefore, the seating surface 15 directly below the cutting edge 17 of the cutting insert 13 is allowed to be in contact with the bottom surface 12A at the peripheral wall portion 11D, thus making it possible to receive cutting resistance acting on the cutting edge 17. Further, as described in the third modified example shown in FIG. 11(c), in a state where the cutting insert 13 is mounted on the insert attachment seat 12, a ridge line where the notched surface 16A of the cutting insert 13 intersects the seating surface 15 may be positioned between parts opened on the bottom surface 12A of the recessed groove 20.

Still further, in the present embodiment, openings between the mutually opposing ends of adjacent recessed grooves 20 on the outer peripheral surface 11C of the neck portion 11B are provided at intervals in the circumferential direction and the outer peripheral surface 11C remains therebetween. However, the openings between the mutually opposing ends of these adjacent recessed grooves 20 may be provided so as to be superimposed on each other. Also, these mutually opposing ends may intersect with each other to provide openings on alternately different sides in the circumferential direction. Further, notched surfaces 16A formed on the cutting insert 13 may be at least equal in number to the wall surfaces 12B. For example, as described in the first embodiment, the cutting insert 13 in which eight notched surfaces 16A are formed at equal intervals in the circumferential direction to assume a regular octagon on a cross-section orthogonal to the central axis C may be used so that four notched surfaces 16A arranged alternately are in contact with the wall surfaces 12B.

On the other hand, in the first and the second embodiments, a plurality of notched surfaces 16A are formed on the seating surface 15 side of a peripheral surface which serves as the flank 16 of the cutting insert 13 as described above. Moreover, such a cutting insert 13 that is free of these notched surfaces 16A in which the peripheral surface serving as the flank 16 is formed in a circular surface shape extending over the circumference is mounted detachably on the insert attachment seat 12 to provide a rotary cutting tool. This rotary cutting tool may be applied to the present invention. FIG. 12 to FIG. 16 show the third and the fourth embodiments of the rotary cutting tool of the present invention on which the above-described cutting insert 13 is mounted. Constituents commonly used in the first and the second embodiments will be denoted the same reference numerals to simplify the explanation.

Figure 13:
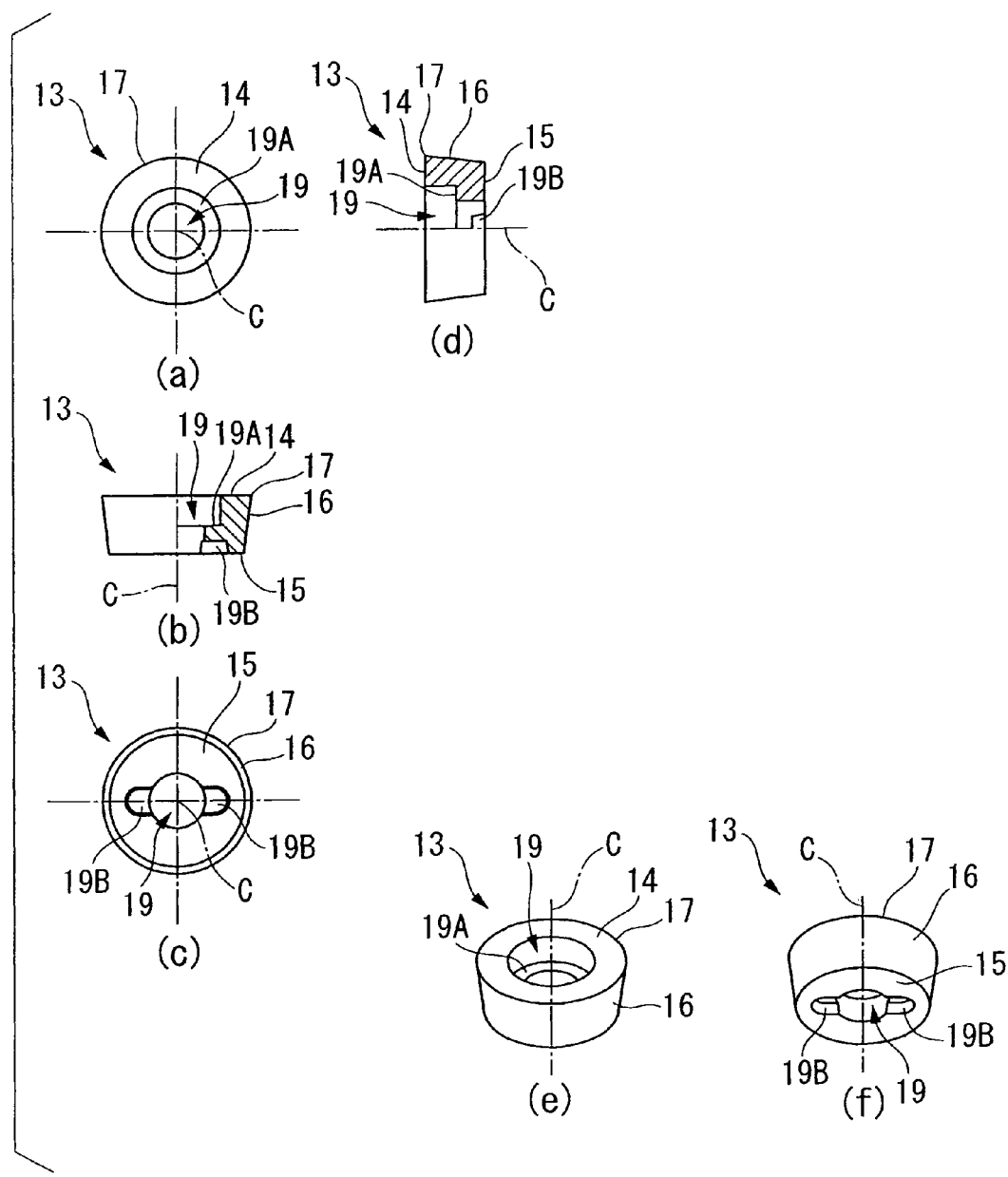
FIG. 13 covers drawings which show a cutting insert 13 of the third embodiment and a fourth embodiment of the present invention in which (*a*) is a plan view when viewed from a rake face 14 side, (*b*) is a partially broken-out side elevational view when viewed from below FIG. 13(*a*), (*c*) is a bottom surface drawing when viewed from a seating surface 15 side, (*d*) is a partially broken-out side elevational view when viewed from the right side in FIG. 13(*a*), (*e*) is a perspective view when viewed from the rake face 14 side, and (*f*) is a perspective view when viewed from the seating surface 15 side.

As shown in FIG. 13, the cutting insert 13 mounted on the rotary cutting tool described in the third and the fourth embodiments is a positive insert in which, as with the first and the second embodiments, a peripheral surface which serves as the flank 16 is formed in a convex conical surface shape so as to gradually decrease in the outer diameter toward the seating surface 15 side from the rake face 14. However, as described above, no notched surface 16A is formed on the seating surface 15 side thereof, and a cross-section orthogonal to the central axis C of the peripheral surface is formed so as to provide a circular shape extending over the entire length in the direction of the central axis C. Further, a pair of recessed portions 19B extending in an oval shape in the diametrical direction with respect to the central axis C are formed at an opening on the seating surface 15 side of the mounting hole 19 so as to be opened on the seating surface 15, while communicatively connecting to the mounting hole 19.

In the rotary cutting tool of the third embodiment on which the above-described cutting insert 13 is mounted, the flank 16 (peripheral surface) of the cutting insert 13 is formed in a convex conical surface shape as a whole. As a result, the wall surface 12B of the insert attachment seat 12 is formed in a recessed conical surface shape at the center of the axis line O in which the flank 16 is made smaller in inclination angle with respect to the axis line O in a range of 0.1° to 5° and preferably at about 2° than an inclination angle with respect to the central axis C, that is, a relief angle formed by the cutting edge 17, and gradually decreased in the inner diameter toward the bottom surface 12A side. That is, a cross-section orthogonal to the axis line O is formed so as to be arranged on a circumference at the center of the axis line O extending in the direction of the axis line O. Further, a pair of key-type protruding portions 12D accommodated respectively at the recessed portions 19B of the cutting insert 13 are formed around an opening of the threaded hole 12C of the bottom surface 12A.

Figure 12:
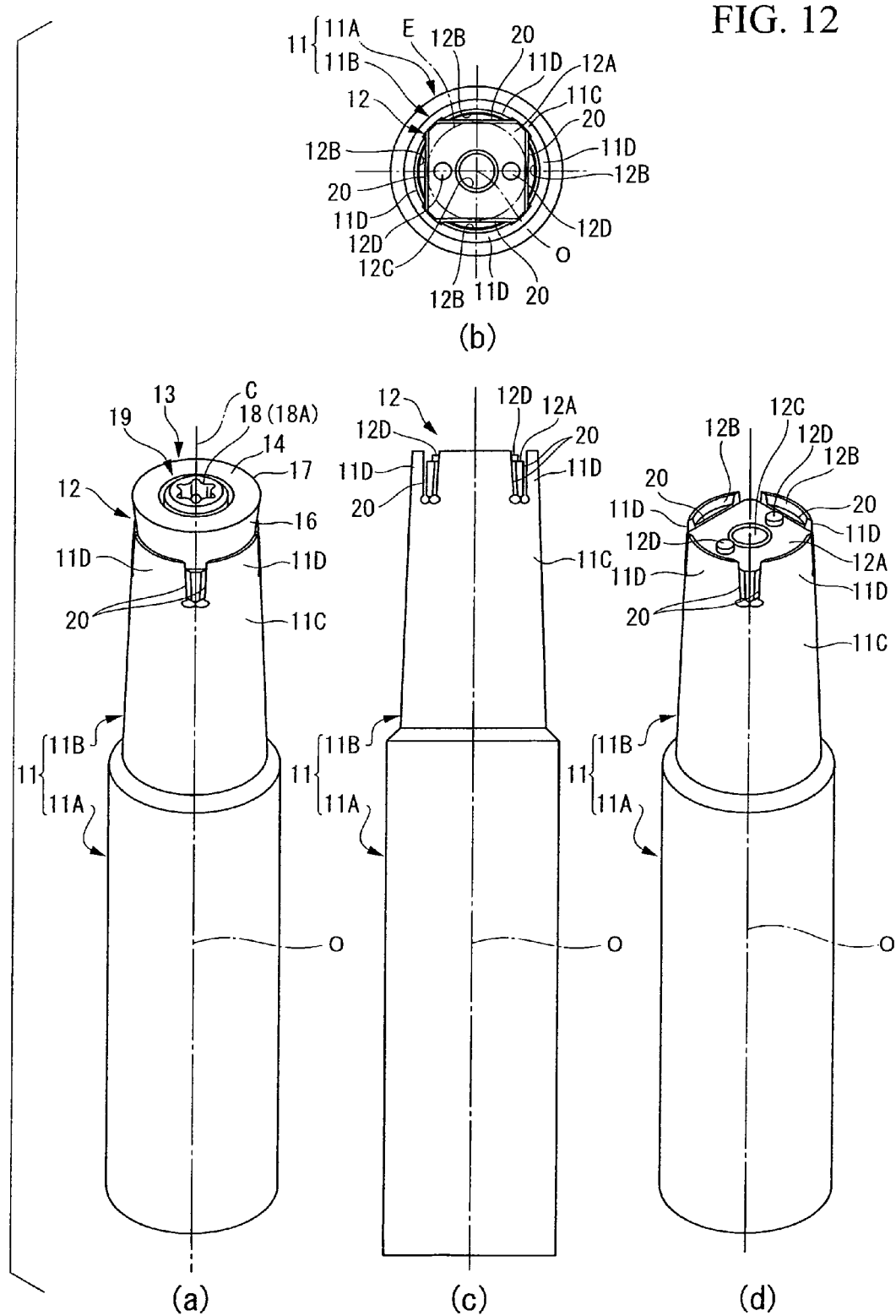
FIG. 12 covers drawings which show a third embodiment of the present invention in which (*a*) is a perspective view thereof, (*b*) is a plan view of the tool body 11 of the second embodiment when viewed from the leading end side of the axis line O direction, (*c*) is a side elevational view of the tool body 11 and (*d*) is a perspective view of the tool body 11.

Then, as with the second embodiment, a plurality (4) of recessed grooves 20 which are in a slit shape and recessed to the rear end side in the direction of the axis line O from the bottom surface 12A are formed also on the bottom surface 12A of the insert attachment seat 12 so as to extend in the circumferential direction of the neck portion 11B along the tangential direction of a circle E which is centered on the axis line O over the respective entire lengths as shown in FIG. 12 when viewed from the leading end side in the direction of the axis line O and opened on the outer peripheral surface 11C. And, as a whole, these recessed grooves 20 are formed so as to assume a square shape externally in contact with the circle E and travel around the insert attachment seat 12.

Therefore, these recessed grooves 20 also extend to the outer peripheral side in the radial direction with respect to the circle E toward the both end sides thereof from the center in contact with the circle E. Then, the bottom surface 12A of the insert attachment seat 12 which is also formed so as to assume a square shape extends at the corners of the square extending to the outer peripheral side. Further, the wall surface 12B is divided in the circumferential direction by the recessed grooves 20 and can be slightly increased or decreased in the inner diameter in association with elastic deformation of the peripheral wall portion 11D formed between the recessed groove 20 and the outer peripheral surface 11C of the neck portion 11B.

Then, as described above, a circular ridge line where the wall surface 12B of the insert attachment seat 12 formed in a recessed conical surface shape which is centered on the axis line O intersects the bottom surface 12A perpendicular to the axis line O is made larger in diameter than the circle E with which each of the recessed grooves 20 is in contact. Therefore, also in the present embodiment, as described in the second modified example of the second embodiment shown in FIG. 11(b), an outer peripheral part of the bottom surface 12A remains so as to continue to the wall surface 12B between a recessed groove 20 and the wall surface 12B at each peripheral wall portion 11D divided circumferentially by this recessed groove 20.

The cutting insert 13 is accommodated and seated on the thus constituted insert attachment seat 12 in such a manner that the seating surface 15 is opposed to the bottom surface 12A and the protruding portion 12D is loosely fitted into the recess 19B. Further, the clamping screw 18 which has been inserted into the mounting hole 19 is screwed into the threaded hole 12C. Thereby, as with the first and the second embodiments, the seating surface 15 is firmly attached to the bottom surface 12A and in contact therewith, and the flank 16 is in contact with the wall surface 12B. Then, the peripheral wall portion 11D is elastically deformed so as to press and expand the wall surface 12B, by which the cutting insert 13 is mounted on the insert attachment seat 12.

Therefore, also in the above-described third embodiment, as with the first and the second embodiments, even if the cutting insert 13 is a peripheral surface non-polished product lower in cost, the peripheral surface (flank 16) of which is sintered as it is, it is possible to precisely dispose the cutting edge 17 which is positioned on a circular surface formed by the flank 16 at the center of the axis line O of the shank portion 11A of the tool body 11 and also to perform turning with a high degree of precision. Further, the seating surface 15 of the cutting insert 13 is in contact with the bottom surface 12A of the insert attachment seat 12 extending between the ends of the recessed grooves 20. Therefore, cutting resistance acting on the cutting edge 17 can be directly received or dispersed by the thus extended bottom surface 12A to secure rigidity on mounting the insert.

Further, in the present embodiment, as described above, an outer peripheral part of the bottom surface 12A is formed also at each of the peripheral wall portions 11D divided by a recessed groove 20 in the circumferential direction so as to remain between the recessed groove 20 and the wall surface 12B. Therefore, if the seating surface 15 of the cutting insert 13 is allowed to be in contact with an outer peripheral part of the bottom surface 12A between the recessed groove 20 and the wall surface 12B in a state where the cutting insert 13 is mounted on the insert attachment seat 12, it is possible to support the seating surface 15 directly below the cutting edge 17 by the bottom surface 12A extending over a wider range. As a result, it is possible to further improve rigidity on mounting the insert and perform turning more stably.

Moreover, in the present embodiment, the peripheral surface (flank 16) of the cutting insert 13 is formed so as to be circular at the center of central axis C extending over the circumference and each of the wall surfaces 12B of the insert attachment seat 12 is also formed in a circular-arc surface (recessed circular conical surface) shape in such a manner that a cross-section orthogonal to the axis line O assumes a circular arc positioning on the circumference at the center of the axis line O. In this instance, large loads act on the circular plate-like cutting insert 13 in the circumferential direction when cutting. Then, when the cutting insert 13 is rotated, depending on the rotating direction, the clamping screw 18 may be loosened or in contrast, the clamping screw 18 may be excessively screwed into the threaded hole 12C, thus resulting in difficulty in detaching the cutting insert 13.

Therefore, in the present embodiment, a protruding portion 12D is formed on the bottom surface 12A of the insert attachment seat 12 and accommodated so as to be loosely fitted into a recess 19B formed on the seating surface 15 of the cutting insert 13, by which the cutting insert 13 is seated on the insert attachment seat 12. For this reason, if the cutting insert 13 is attempted to be rotated in the circumferential direction, the recess 19B is caught at the protruding portion 12D to restrain the rotation of the cutting insert 13. Therefore, it is possible to prevent the clamping screw 18 from being loosened or screwed into excessively. Further, as described above, since the protruding portion 12D is inserted and only loosely fitted into the recess 19B so as to provide a clearance in the vicinity, there is no chance that elastic deformation of the peripheral wall portion 11D interferes with positioning of the cutting insert 13 to pose a problem.

Figure 14:
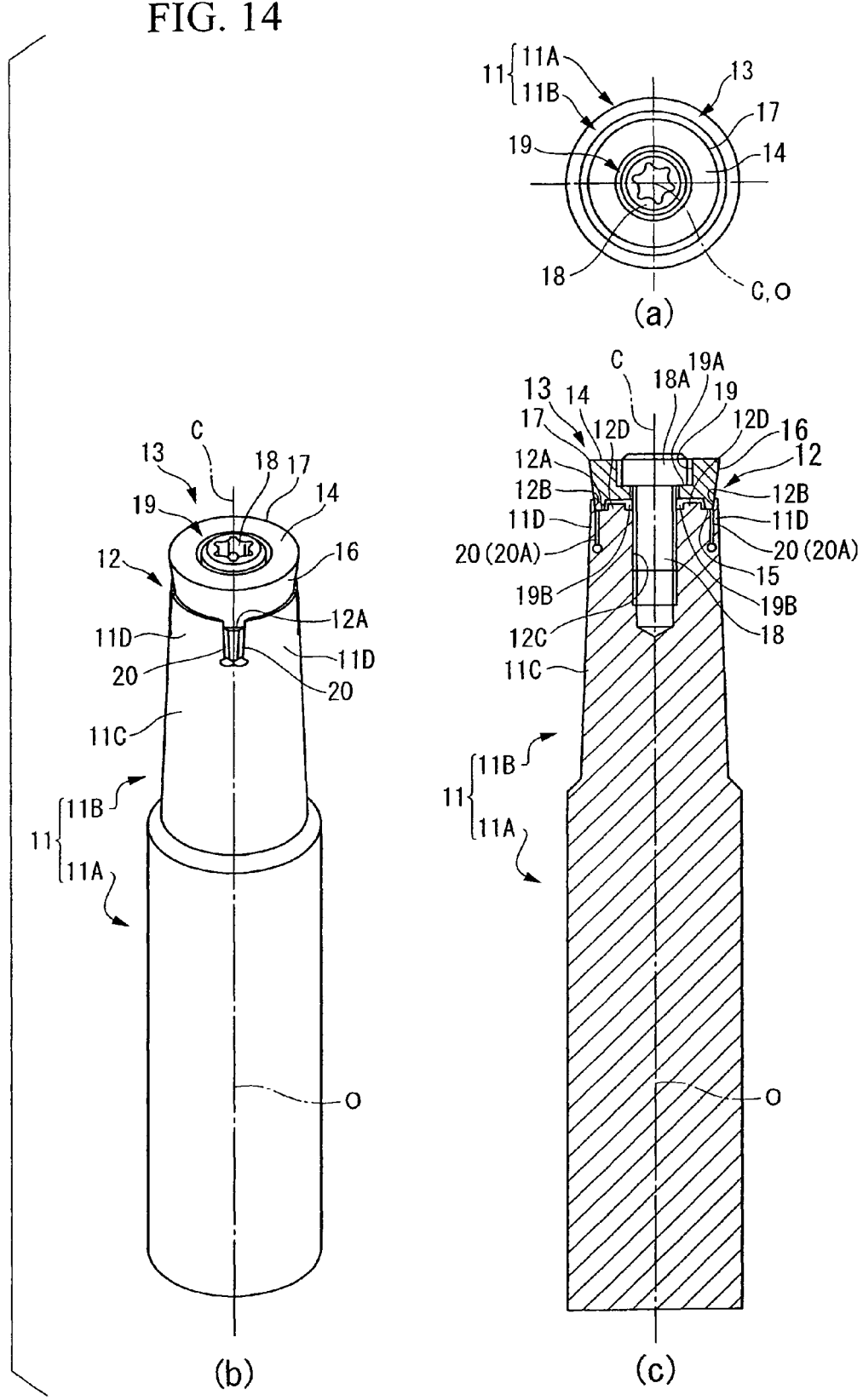
FIG. 14 covers drawings which show the fourth embodiment of the present invention in which (*a*) is a plan view when viewed from the leading end side of the axis line O direction, (*b*) is a perspective view, and (*c*) is a longitudinal sectional view.
Figure 15:
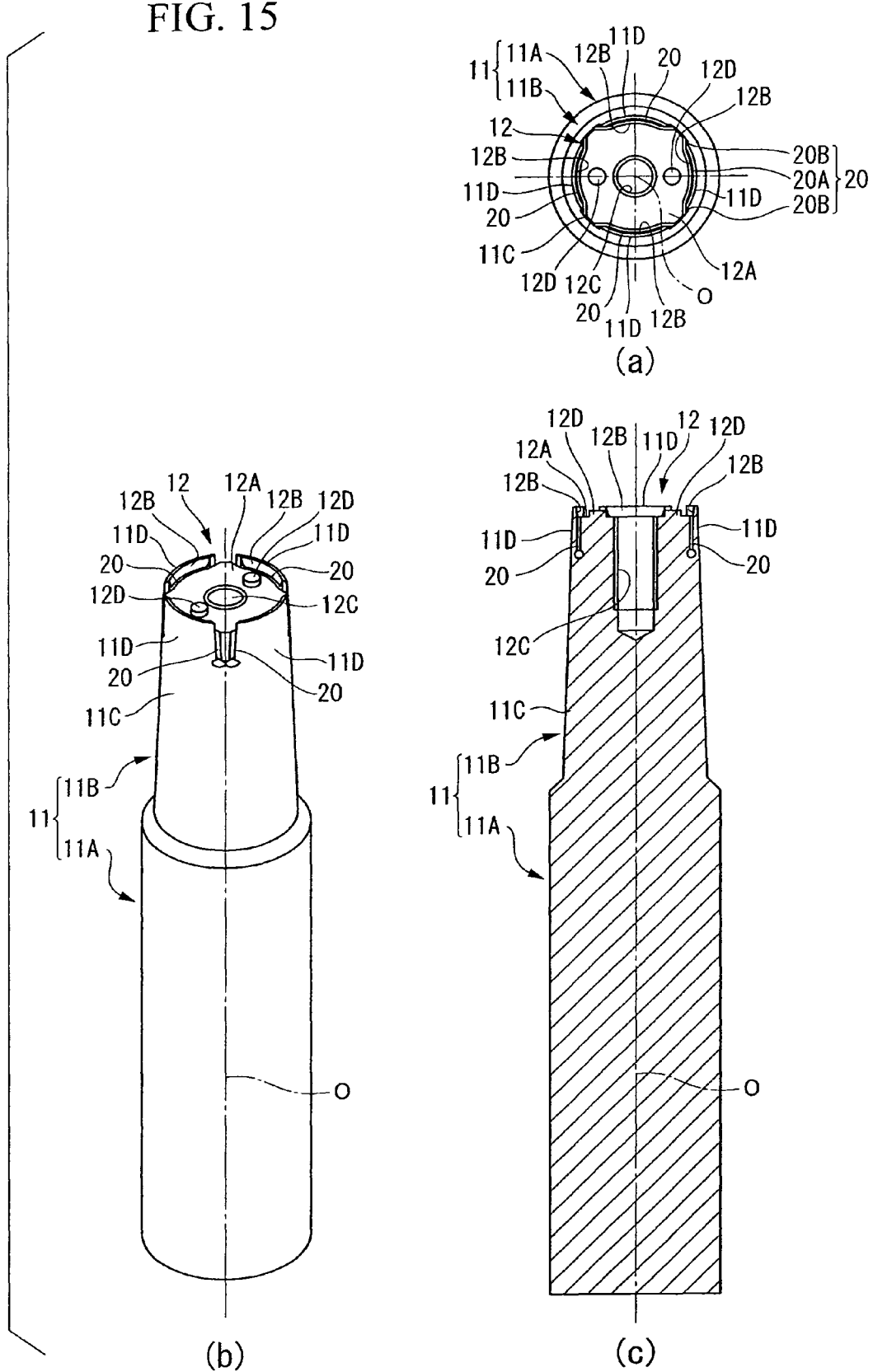
FIG. 15 covers drawings which show the tool body 11 of the fourth embodiment of the present invention in which (*a*) is a plan view when viewed from the leading end side of the axis line O direction, (*b*) is a perspective view, and (*c*) is a longitudinal sectional view.
Figure 16:
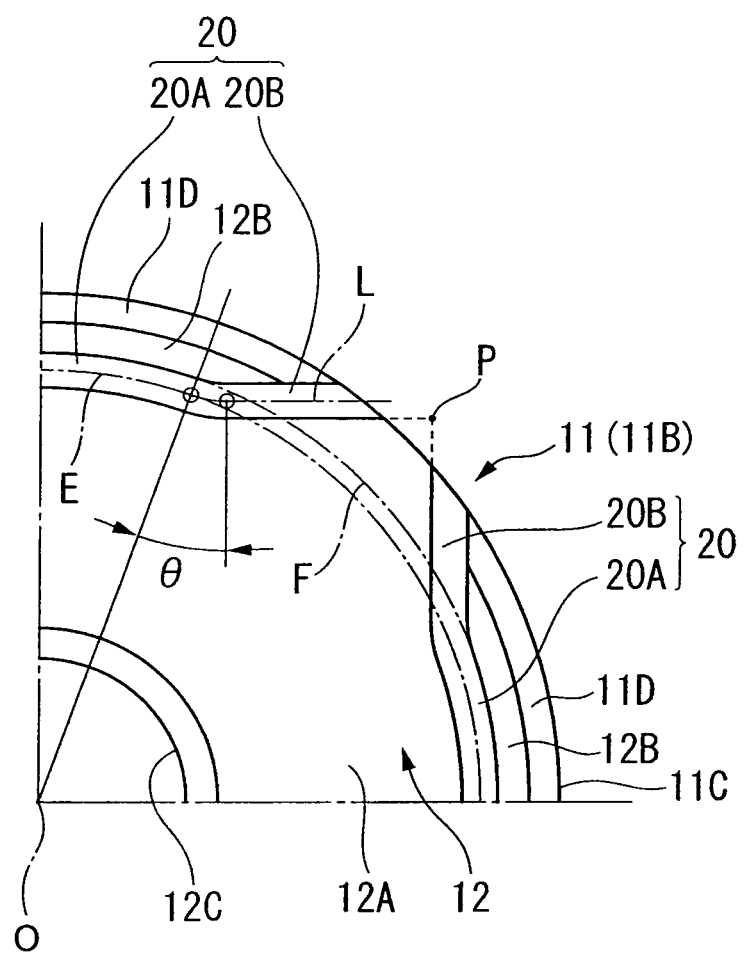
FIG. 16 is a partially enlarged plan view of the insert attachment seat 12 of the fourth embodiment in the present invention when viewed from the leading end side of the axis line O direction.

Then, in the fourth embodiment shown in FIG. 14 to FIG. 16, on attaching the cutting insert 13 shown in FIG. 13, each of the recessed grooves 20 does not extend in a straight line over the entire length in the tangential direction of the circle E, as with the first to the third embodiments. However, as shown in FIG. 16, the recessed groove 20 is formed in such a manner that a center 20A thereof assumes a circular arc shape along the circle E which is centered on the axis line O, when viewed from the leading end side in the direction of the axis line O. Then, both ends 20B of the recessed groove 20 extend to the outer peripheral side in the radial direction with respect to the axis line O from the circle E so as to extend along a tangent L of a circle smaller in radius than the circle E toward the both end sides of the recessed groove 20 from the center of the circular arc shape. Thus, a bottom surface 12A extends between mutually opposing ends 20B adjacent to the recessed grooves 20 which move to the outer peripheral side.

Here, as shown in FIG. 16, a part between the circular arc-like center 20A along the circle E of a recessed groove 20 and the ends 20B along the tangent L is formed in a circular arc shape curved in a direction opposite to the center 20A, smoothly continuing to the center 20A and the ends 20B. A central angle θ of the circular arc at this part is to be 15° or more. The tangent L along which the end 20B extends may be formed in a straight line so as to be common at both ends 20B of one recessed groove 20 or may be formed to be different at the both ends 20B so that extension lines to the center 20A side intersect each other.

Further, in the present embodiment, as shown in FIG. 14(c), in a state where the cutting insert 13 is mounted on the insert attachment seat 12, a circular ridge line where the flank 16 of the cutting insert 13 intersects the seating surface 15 is coincident with a circular arc-like ridge line where the wall surface 12B of the insert attachment seat 12 intersects the center 20A of the recessed groove 20. Still further, an intersection point P of extension lines to the outer peripheral side in the radial direction on the respective ridge lines where the mutually opposing ends 20B of adjacent recessed grooves 20 intersect the bottom surfaces 12A of the insert attachment seat 12 extending between these ends 20B is positioned on a circle F formed by connecting the circular-arc ridge line where the center 20A of each recessed groove 20 intersects the wall surface 12B or positioned outside the circle.

Therefore, also in the above-described fourth embodiment, the wall surface 12B formed at the peripheral wall portion 11D which undergoes elastic deformation is in contact with the flank 16, by which the cutting insert 13 is precisely positioned so that the cutting edge 17 is arranged at the center of the axis line O. Further, since the intersection point P is positioned outside the circle F, the outer peripheral edge on the seating surface 15 of the cutting insert 13 which is coincident with the circle F is reliably allowed to be in contact with the bottom surface 12A extending between the mutually opposing ends 20B of the adjacent recessed grooves 20. It is, thereby, possible to receive cutting loads sufficiently, acting on the cutting edge 17 and improve rigidity on mounting the insert.

Further, the center 20A of a recessed groove 20 is formed in a circular arc shape along the circle E at the center of the axis line O. Therefore, the peripheral wall portion 11D formed between the recessed groove 20 and the outer peripheral surface 11C of the neck portion 11B can be decreased in radial thickness at the center 20A. Thus, it is possible to elastically deform the peripheral wall portion 11D at a lower amount and cope with a greater dimensional change in the cutting insert 13.

The cutting insert 13 described in the first to the fourth embodiments is formed in such a manner that, except the notched surfaces 16A of the cutting insert 13 in the first and the second embodiments, a peripheral surface which serves as the flank 16 is in a convex conical surface shape and extends at a constant inclination angle (relief angle) from the rake face 14 to the seating surface 15. However, a multiple-stage flank may be provided in which the inclination angle is changed in progress to the seating surface 15. In this instance, an inclination angle of the wall surface 12B in the second and the third embodiments may be only made slightly smaller than an inclination angle of the flank 16 on the seating surface 15 side.

Further, in the first to the fourth embodiments, as described above, the cutting insert 13 is a positive insert in which the flank 16 is inclined, and the wall surface 12B is firmly attached to the seating surface 15 side of the flank 16 and in contact therewith. However, if the wall surface 12B of the insert attachment seat 12 is able to be in contact with a peripheral surface (flank) of the cutting insert even partially, the present invention is applicable to a negative insert in which the peripheral surface which serves as the flank is provided as a circular peripheral surface (cylindrical surface) parallel with the central axis of the cutting insert. In this instance, for example, the wall surface 12B of the insert attachment seat 12 may be tapered reversely, unlike the above-described embodiments, and formed in a recessed conical surface shape which is centered on the axis line O so as to gradually decrease in the inner diameter away from the bottom surface 12A side.

An explanation has been so far made for preferred embodiments of the present invention, to which the present invention shall not be limited to the embodiments described above. The present invention may be subjected to addition of the constitution, omission, replacement and other modifications within a scope not departing from the gist thereof. The present invention shall not be limited to the above description but will be limited only by the scope of the attached claims.

INDUSTRIAL APPLICABILITY

The present invention relates to a rotary cutting tool which is provided with a tool body having a shank portion and a neck portion protruding from the shank portion and formed externally in a circular truncated cone shape or a cylindrical shape, a recessed insert attachment seat formed at the tip of the neck portion of the tool body, and a circular plate-like cutting insert which is detachably mounted on the insert attachment seat so as to be coaxial with the axis line of the shank portion, and the rotary cutting tool in which the insert attachment seat is provided with a bottom surface on which a side surface serving as a seating surface of the cutting insert is seated and a wall surface in contact with a peripheral surface of the cutting insert, a plurality of recessed grooves which are recessed from the bottom surface to extend in the circumferential direction of the neck portion, with the both ends being opened to the outer peripheral surface of the neck portion from the wall surface, are formed on the bottom surface so as to travel around the insert attachment seat around the axis line, each of these recessed grooves extends in such a manner that at least the both ends thereof move radially to the outer peripheral side with respect to the axis line toward the both end sides from a circle which is centered on the axis line in contact with the center between these both ends, and the bottom surface extends between the mutually opposing ends of the recessed grooves adjacent in the circumferential direction.

According to the rotary cutting tool of the present invention, even if the circular plate-like cutting insert is a peripheral surface non-polished product lower in cost, a peripheral surface continuing to the cutting edge is allowed to be in contact with the wall surface of the insert attachment seat, by which the center of the circular cutting edge can be made coincident with the axis line of the shank portion of the tool body. Further, the bottom surface of the insert attachment seat is allowed to extend between the mutually opposing ends of the adjacent recessed grooves and an outer peripheral edge of the seating surface directly below the cutting edge is allowed to be in contact with the bottom surface. Thereby, cutting resistance acting on the cutting edge can be received to improve the cutting insert mounting more stably. It is, therefore, possible to perform turning with a high degree of precision without causing damage to a tool such as chipping.

LIST OF REFERENCE NUMERALS

11: Tool body
11A: Shank portion
11B: Neck portion
11C: Outer peripheral surface of neck portion 11B
11D: Peripheral wall portion
11E: Circumferential end edge of peripheral wall portion 11D
11F: Recessed wall portion
11G: Bottom surface portion
11H: Chamfered wall portion
12: Insert attachment seat
12A: Bottom surface of insert attachment seat 12
12B: Wall surface of insert attachment seat 12
12C: Threaded hole
12D: Protruding portion
13: Cutting insert
14: Rake face
15: Seating surface
16: Flank (peripheral surface of cutting insert 13)
16A: Notched surface
17: Cutting edge
18: Clamping screw
19: Mounting hole
19A: Flat portion
19B: Recess
19C: Recessed conical surface portion
20: Recessed groove
20A: Center of recessed groove 20
20B: Ends of recessed groove 20
21: Supply hole for coolant
21A: Large diameter hole of supply hole 21
21B: Branching hole of supply hole 21
21C: Ejection hole of supply hole 21
O: Axis line of shank portion 11A of tool body 11
C: Central axis of cutting insert 13
E: Circle at the center of axis line O in contact with the center of recessed groove 20
H: Overhung amount

The invention claimed is:

1. A rotary cutting tool comprising:
   a tool body having a shank portion and a neck portion protruding from the shank portion and formed externally in a circular truncated cone shape or a cylindrical shape;
   a recessed insert attachment seat formed at the tip of the neck portion of the tool body; and
   a circular plate-like cutting insert detachably mounted on the insert attachment seat so as to be coaxial with the axis line of the shank portion;
   wherein the insert attachment seat is provided with a bottom surface on which a side surface serving as a seating surface of the cutting insert is seated and a wall surface in contact with a peripheral surface of the cutting insert,
   a plurality of recessed grooves which are recessed from the bottom surface to extend in the circumferential direction of the neck portion and in a direction toward the shank, with both ends being opened to the outer peripheral surface of the neck portion from the wall surface, are formed on the bottom surface so as to travel around the insert attachment seat around the axis line,
   each of these recessed grooves extends in such a manner that at least the both ends thereof move radially to the outer peripheral side with respect to the axis line toward the both end sides from a circle which is centered on the axis line in contact with the center between these both ends, and
   the bottom surface extends between the mutually opposing ends of the recessed grooves adjacent in the circumferential direction.

2. The rotary cutting tool according to claim 1, wherein in a state where the cutting insert is mounted on the insert attachment seat, the seating surface of the cutting insert overhangs so as to run off from the bottom surface of the insert attachment seat extending between mutually opposing ends of the recessed groove in a range of 1.0 mm or less.

3. The rotary cutting tool according to claim 1, wherein the recessed groove extends so as to incline radially to the inner peripheral side with respect to the axial line toward the groove bottom side of the recessed groove from the bottom surface thereof.

4. The rotary cutting tool according to claim 1, wherein a peripheral wall portion formed between the recessed groove and an outer peripheral surface of the neck portion is formed in such a manner that the peripheral wall portion increases in circumferential width toward the groove bottom side of the recessed groove from the bottom surface.

5. The rotary cutting tool according to claim 4, wherein a circumferential end edge of the peripheral wall portion is formed in such a manner as to increase in circumferential width at least on the groove bottom side of the recessed groove, as the circumferential end edge moves to the groove bottom side while being recessed and curved.

6. The rotary cutting tool according to claim 1, wherein a peripheral wall portion formed between the recessed groove and the outer peripheral surface of the neck portion is formed in such a manner as to increase in circumferential width at least on the groove bottom side of the recessed groove, as the peripheral wall portion moves radially to the inner peripheral side with respect to the axis line.

7. The rotary cutting tool according to claim 6, wherein the circumferential end edge of the peripheral wall portion is formed in such a manner that the peripheral wall portion increases in circumferential width at least on the groove bottom side of the recessed groove as the circumferential end edge moves radially to the inner peripheral side with respect to the axis line, while being recessed and curved.

8. The rotary cutting tool according to claim 1, wherein a supply hole for coolant is drilled on the tool body and the supply hole is opened between the mutually opposing ends of the recessed grooves adjacent in the circumferential direction on the groove bottom side of the recessed groove at the neck portion.

9. The rotary cutting tool according to claim 8, wherein the supply hole for coolant is drilled at the shank portion side along the axis line and drilled on an opening side of the neck portion in such a manner so as to incline radially to the outer peripheral side with respect to the axis line as the supply hole moves to the tip side of the neck portion.

10. The rotary cutting tool according to claim 1, wherein each of the plurality of recessed grooves extends over the entire length in a tangential direction of the circle, the wall surface of the insert attachment seat is formed in a flat surface shape extending in the tangential direction at each part divided by these plurality of recessed grooves, and notched surfaces at least equal in number to the recessed grooves and extending in the tangential direction are formed in the circumferential direction at least to the seating surface side on a peripheral surface of the cutting insert and in contact with the wall surface.

11. The rotary cutting tool according to claim 1, wherein the wall surface of the insert attachment seat is formed in a recessed circular-arc surface shape which is centered on the axis line at each part divided by the plurality of recessed grooves, a peripheral surface of the cutting insert is formed in a circular surface shape which is centered on the axis line at least on the seating surface side of the peripheral surface and in contact with the wall surface, and each of the plurality of recessed grooves extends over the entire length in the tangential direction of the circle smaller in radius than a recessed circular arc formed by the wall surface.

12. The rotary cutting tool according to claim 1, wherein the wall surface of the insert attachment seat is formed in a recessed circular-arc surface shape which is centered on the axis line at each part divided by the plurality of recessed grooves, a peripheral surface of the cutting insert is formed in a circular surface shape which is centered on the axis line at least on the seating surface side of the peripheral surface and in contact with the wall surface, each of the plurality of recessed grooves extends in such a manner that the center thereof extends in a circular arc shape along the circle, and the both ends move radially to the outer peripheral side with respect to the axis line toward the both end sides from the center thereof.

13. The rotary cutting tool according to claim 1, wherein the plurality of recessed grooves are formed in a position of rotational symmetry at every constant angle at the center of the axis line.

14. The rotary cutting tool according to claim 1, wherein the groove bottom of the recessed groove is formed on a circular cross-section, diameter of which is larger than an opening groove width on the bottom surface of the recessed groove.

15. The rotary cutting tool according to claim 1, wherein a protruding portion to be accommodated into a recess formed on the seating surface of the cutting insert is formed on the bottom surface of the insert attachment seat.

* * * * *